United States Patent [19]
Sasaki et al.

[11] Patent Number: 5,717,962
[45] Date of Patent: Feb. 10, 1998

[54] ELECTRIC FLASH APPARATUS USING MOS CONTROLLED THYRISTOR

[75] Inventors: Toyoji Sasaki; Hiroshi Yamada, both of Hachioji, Japan

[73] Assignee: Olympus Optical Co., Ltd., Tokyo, Japan

[21] Appl. No.: 822,545

[22] Filed: Mar. 19, 1997

Related U.S. Application Data

[63] Continuation of Ser. No. 502,187, Jul. 13, 1995, abandoned.

[30] Foreign Application Priority Data

Jul. 19, 1994 [JP] Japan .................................. 6-166902

[51] Int. Cl.⁶ .......................... G03B 15/05; H05B 37/00
[52] U.S. Cl. ................... 396/156; 396/206; 396/159; 396/160; 396/205; 315/241 P
[58] Field of Search .......................... 396/156, 159, 396/160, 205–206; 315/241 P

[56] References Cited

U.S. PATENT DOCUMENTS

| | | |
|---|---|---|
| 4,839,686 | 6/1989 | Hosomizu et al. |
| 4,931,824 | 6/1990 | Takahashi ............... 354/145.1 |
| 4,951,081 | 8/1990 | Hosomizu et al. |
| 5,159,381 | 10/1992 | Harrison ..................... 354/416 |
| 5,184,171 | 2/1993 | Uenishi ........................ 354/416 |
| 5,250,977 | 10/1993 | Tanaka ........................ 354/416 |
| 5,313,247 | 5/1994 | Hosomizu et al. |
| 5,371,568 | 12/1994 | Takagi et al. ............... 354/416 |
| 5,379,089 | 1/1995 | Uenishi et al. .............. 354/416 |
| 5,443,999 | 8/1995 | Uenishi et al. ................. 437/6 |

FOREIGN PATENT DOCUMENTS

| | | |
|---|---|---|
| 64-17033 | 1/1989 | Japan . |
| 1-124838 | 5/1989 | Japan . |

OTHER PUBLICATIONS

MCT User's Guide (Harris); "P–Type MOS Controlled Thyristor" pp. 2–12 to 2–17 and 8–4 to 8–23, Harris Corporation, Dec. 1993.

*Primary Examiner*—Howard B. Blankenship
*Assistant Examiner*—Michael Dalakis
*Attorney, Agent, or Firm*—Frishauf, Holtz, Goodman, Langer & Chick

[57] ABSTRACT

A power supply circuit includes a booster circuit for boosting an output voltage from a power supply battery to predetermined positive and negative voltages, respectively. A main capacitor is charged by the predetermined positive or negative voltage boosted by the power supply circuit. In a discharge tube, a discharge current flows on the basis of the charge built up on the main capacitor, so that flash light emission is performed. A MOS controlled thyristor (MCT) is inserted in the loop of the discharge current from the main capacitor. A control circuit ON/OFF-controls the MCT by selectively applying the predetermined positive or negative voltage from the power supply circuit to the gate terminal of the MCT.

18 Claims, 15 Drawing Sheets

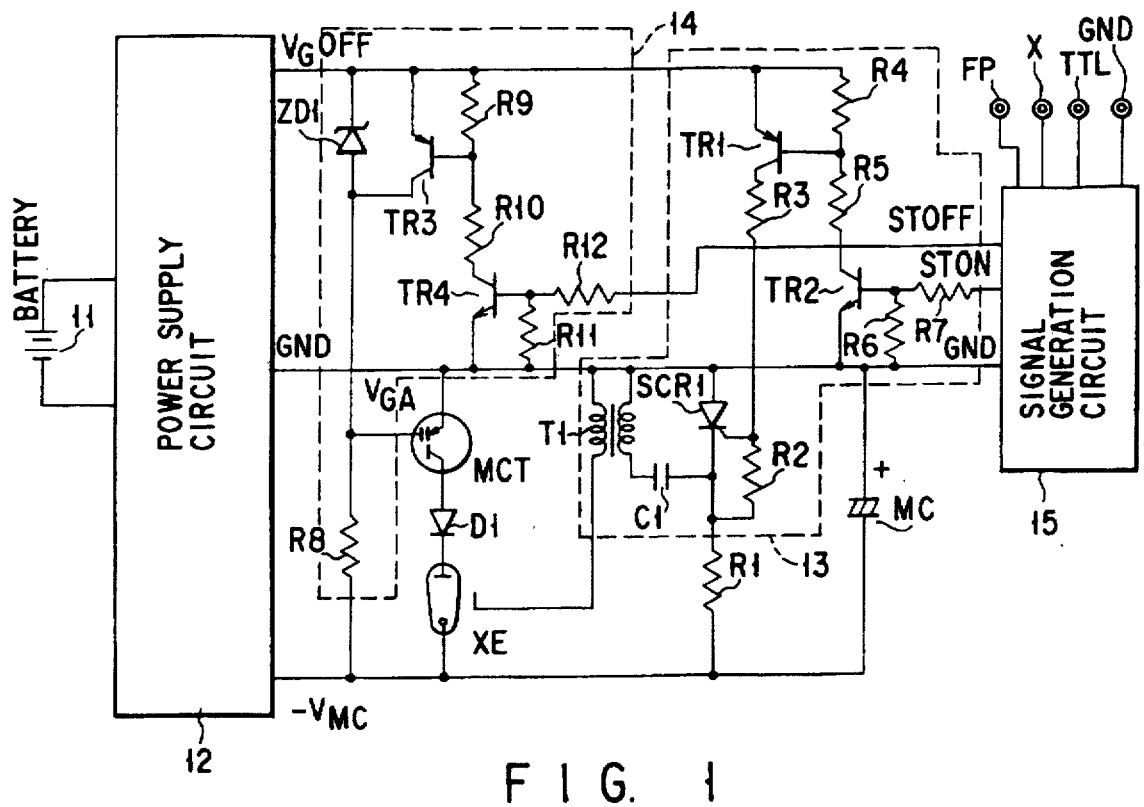
F I G. 1
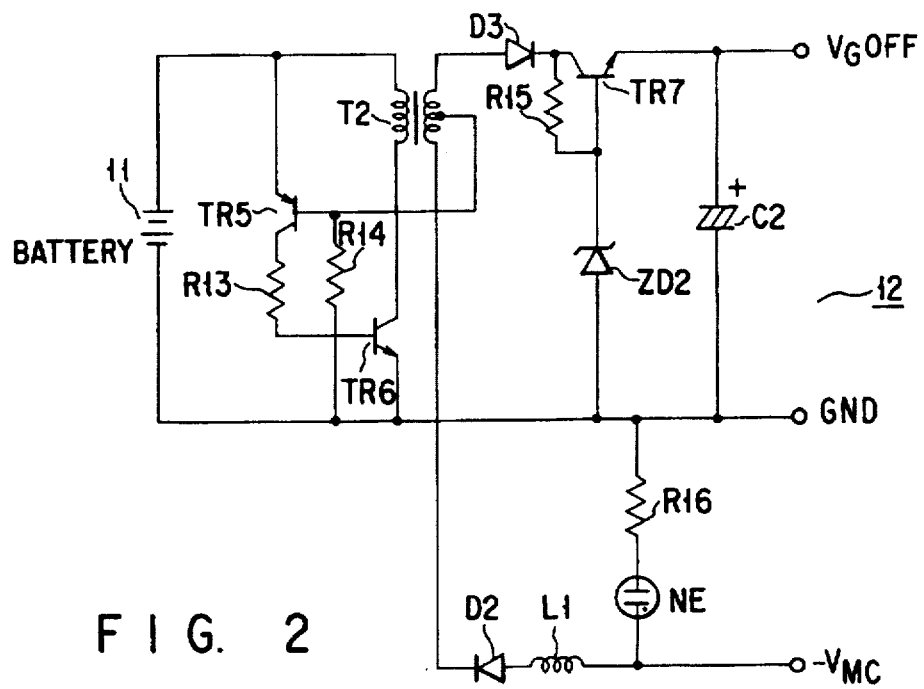
F I G. 2

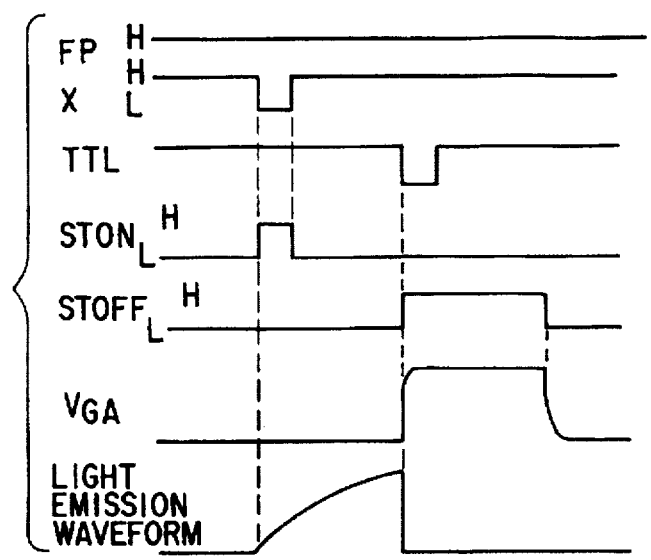
F I G. 3
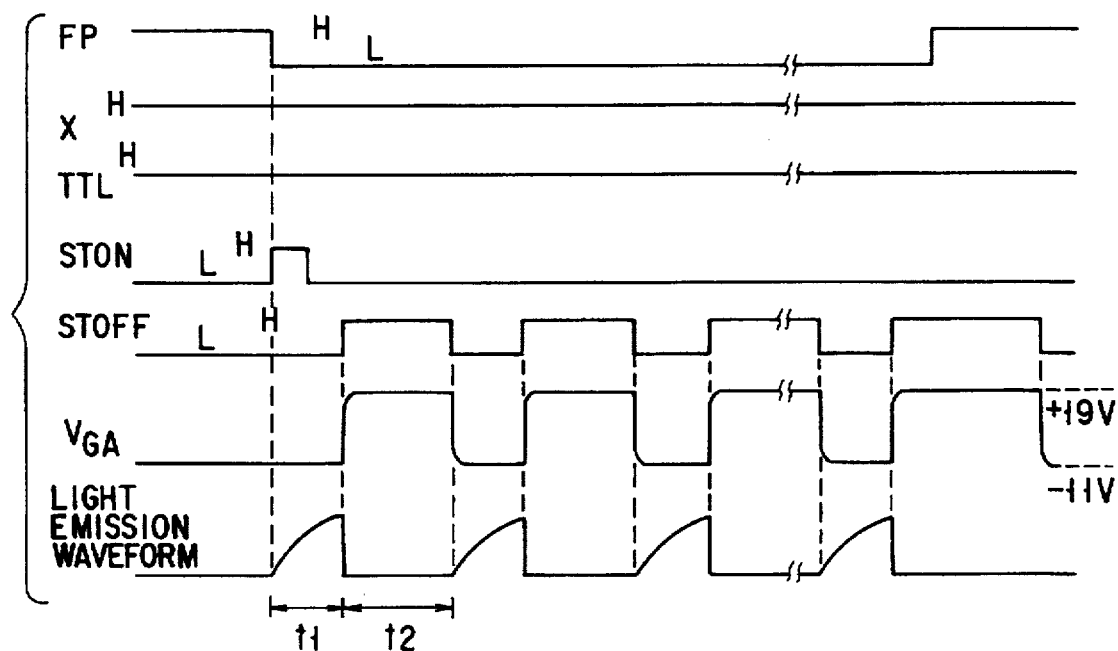
F I G. 4

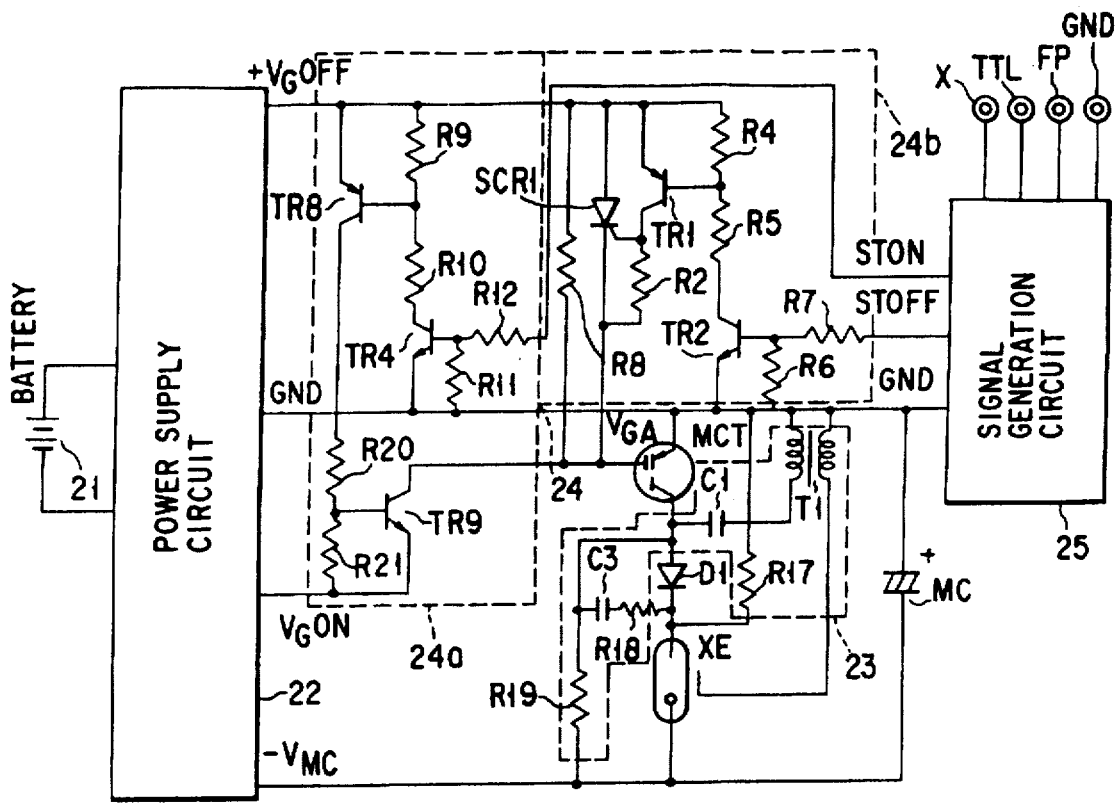
F I G. 5
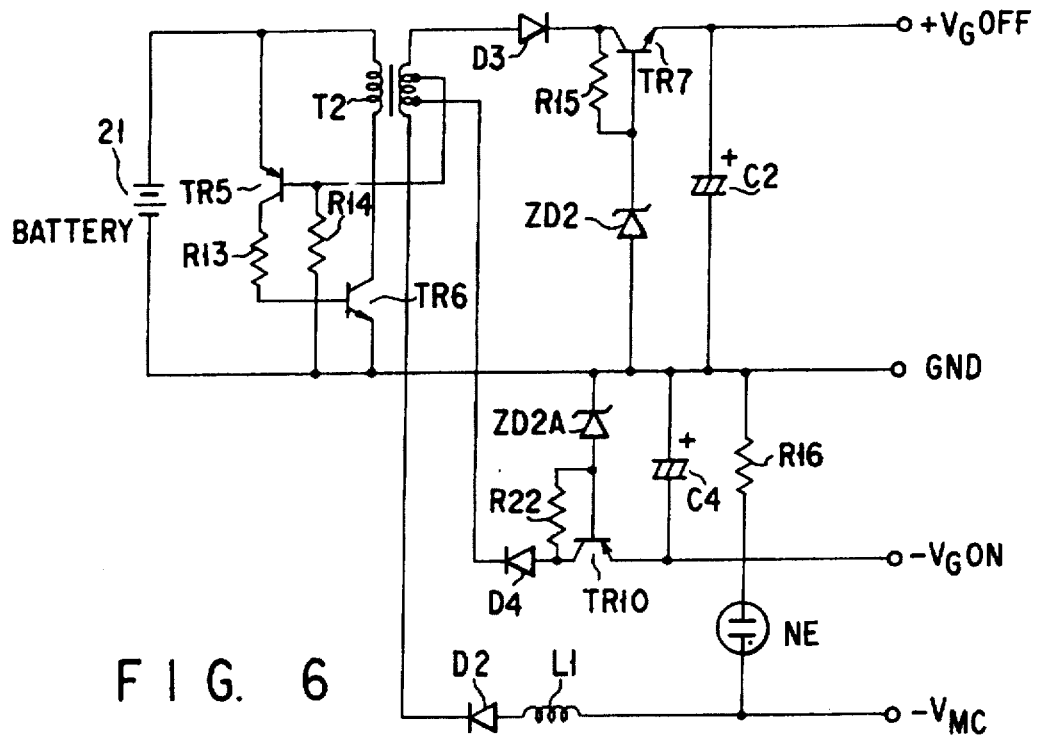
F I G. 6

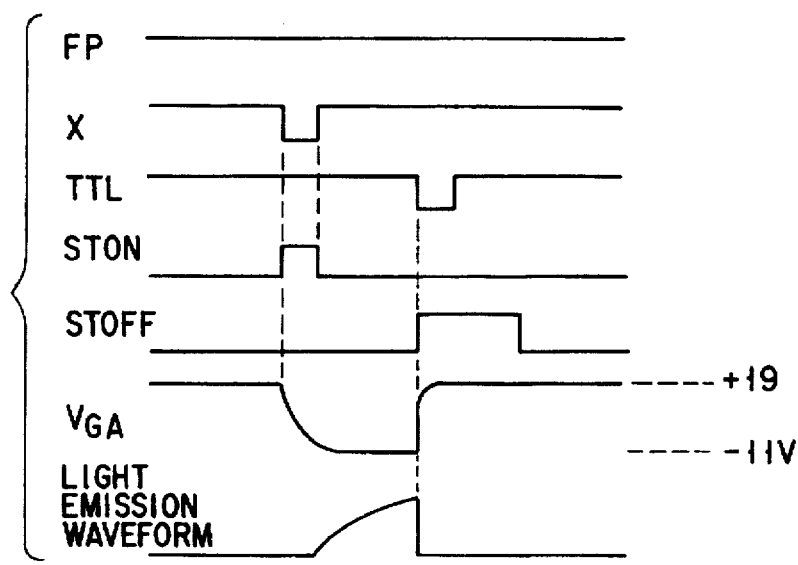
F I G. 7
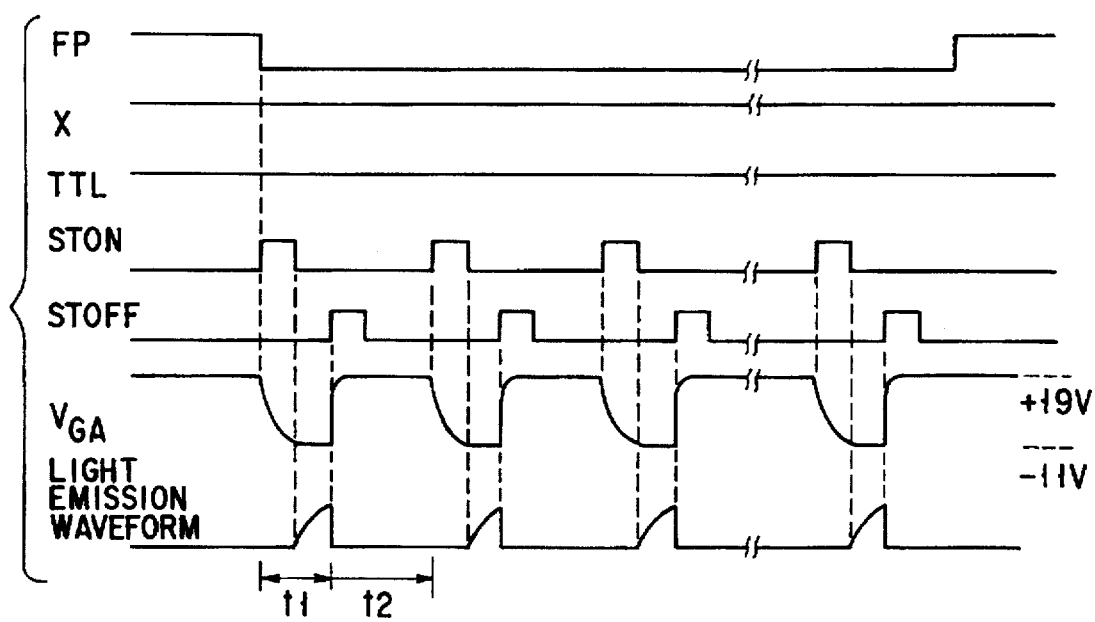
F I G. 8

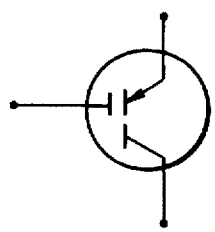
(P-MOS TYPE MCT)
(PRIOR ART)
F I G. 11A
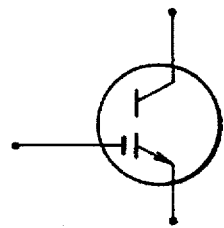
(N-MOS TYPE MCT)
(PRIOR ART)
F I G. 11B
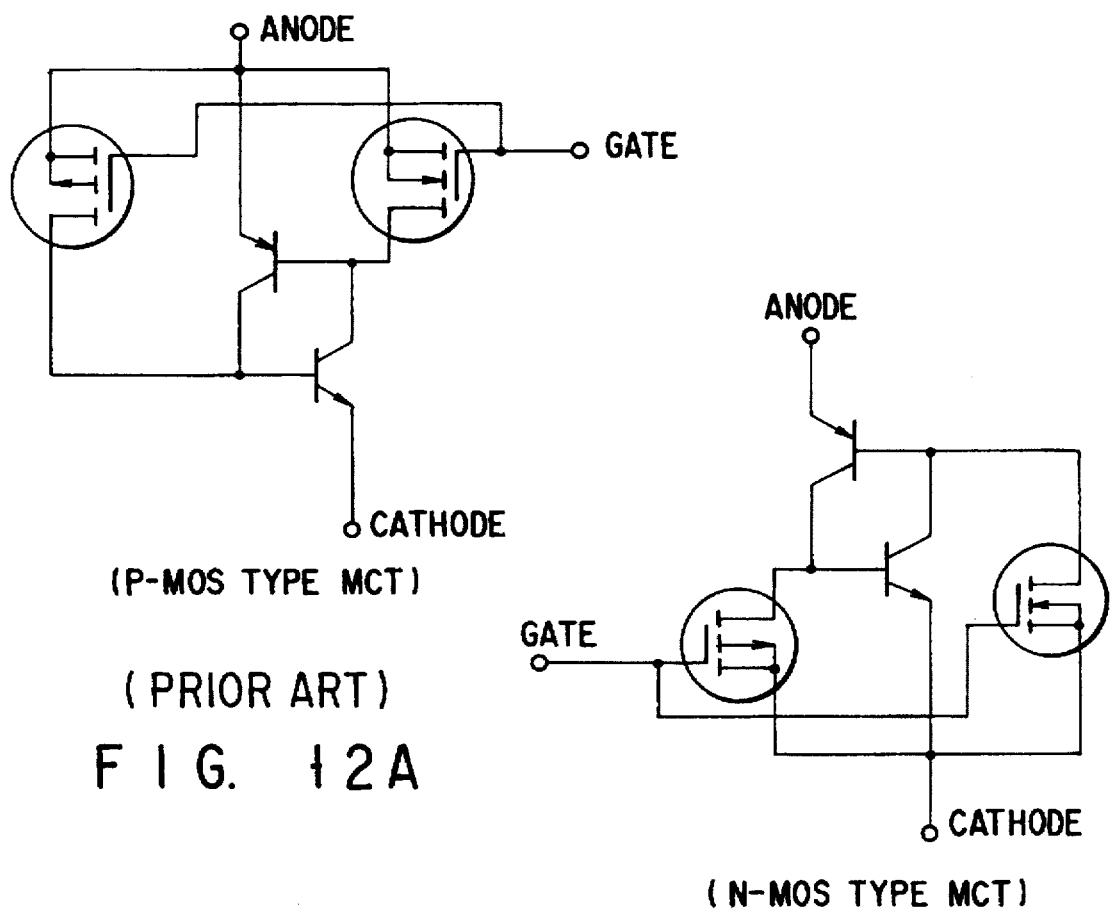
(P-MOS TYPE MCT)
(PRIOR ART)
F I G. 12A
(N-MOS TYPE MCT)
(PRIOR ART)
F I G. 12B

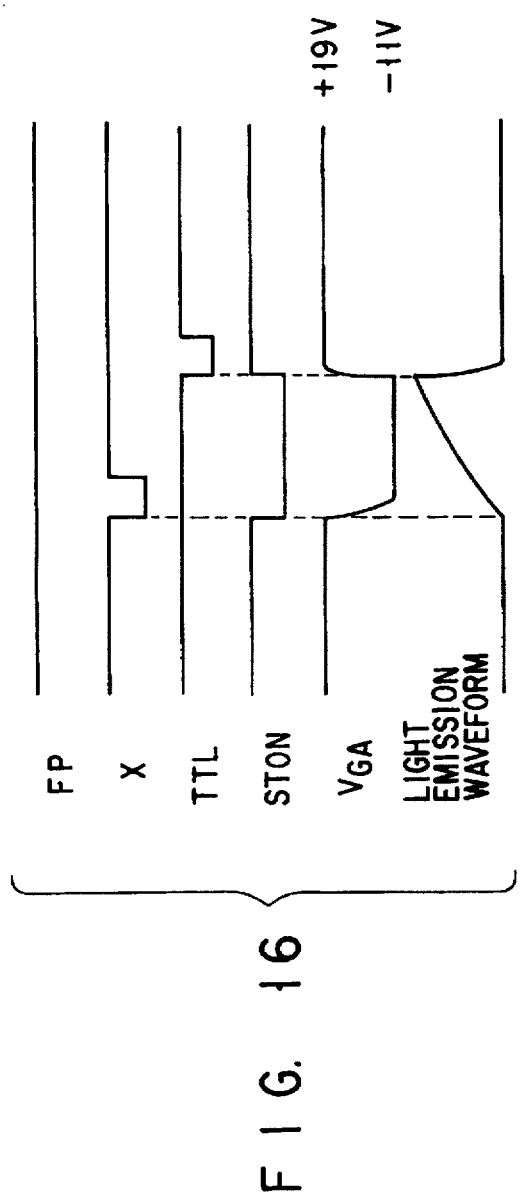
F I G. 16
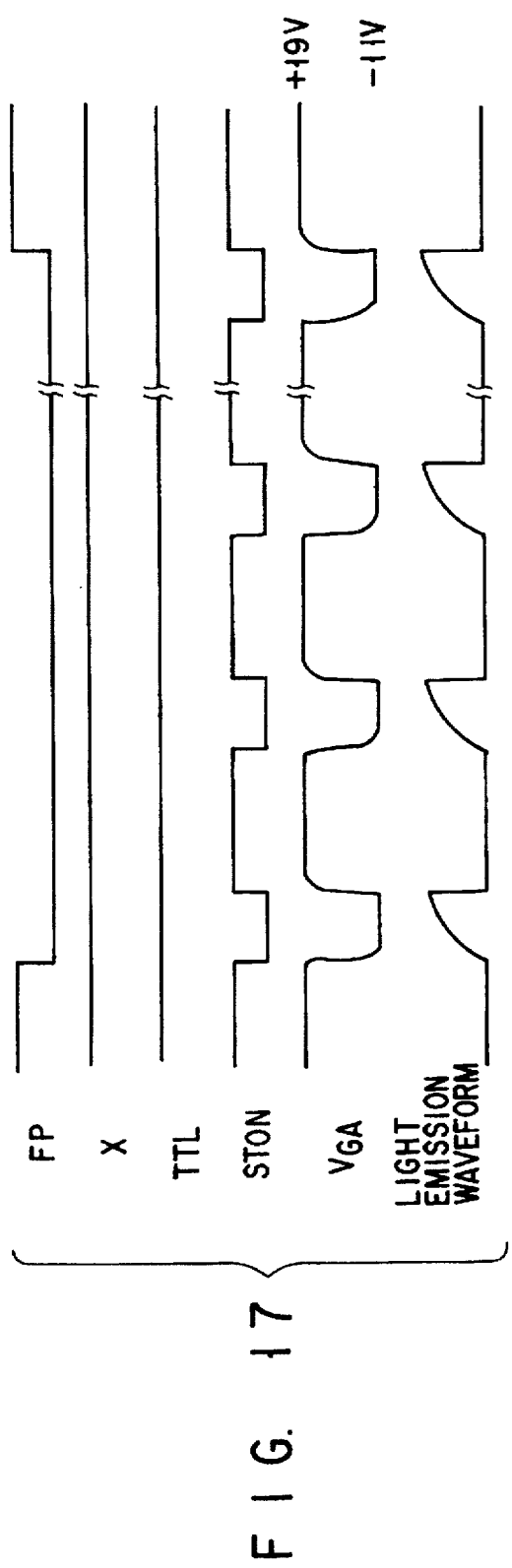
F I G. 17

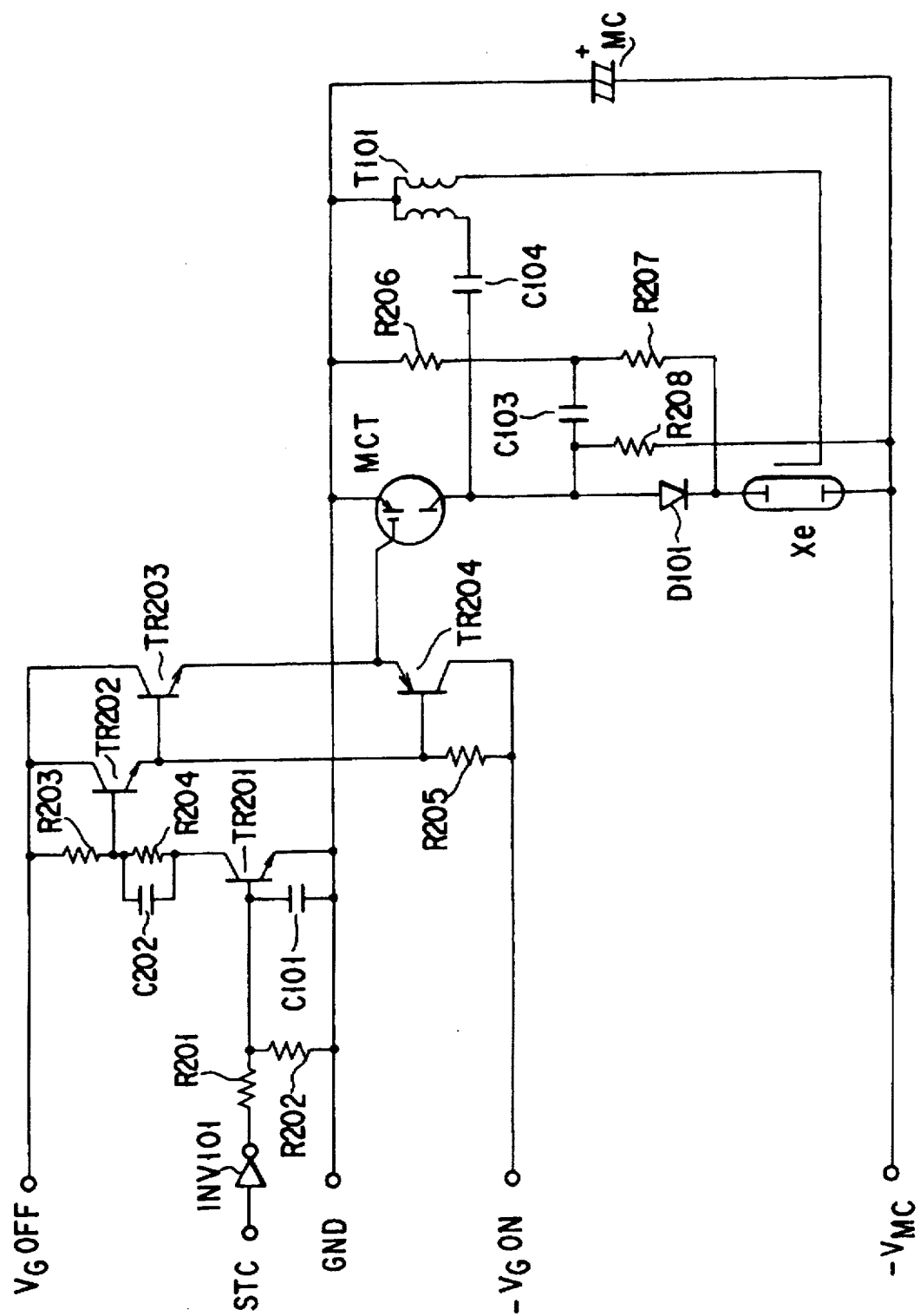
F I G. 21

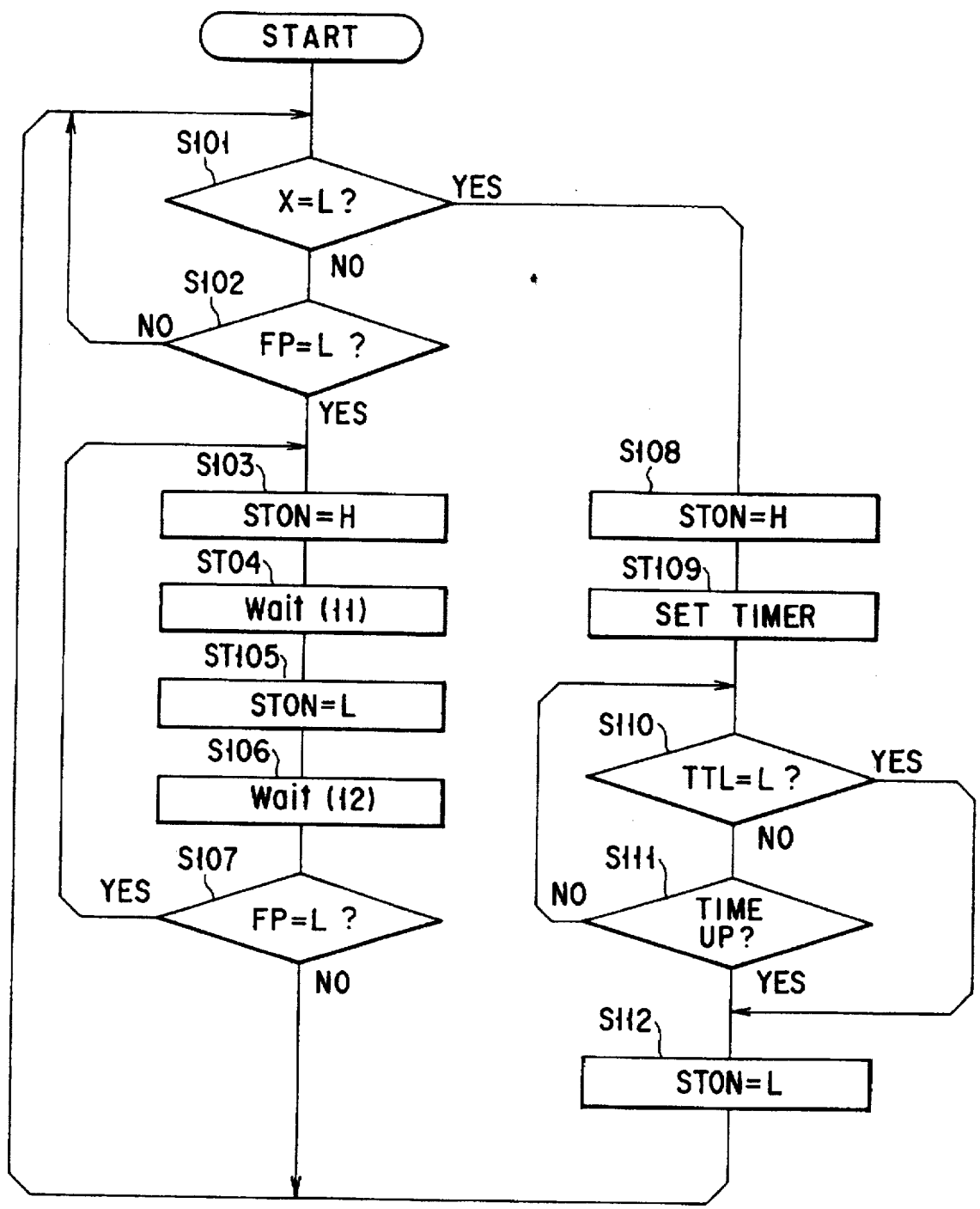
F I G. 24

ELECTRIC FLASH APPARATUS USING MOS CONTROLLED THYRISTOR

This application is a Continuation of application Ser. No. 08/502,187, filed Jul. 13, 1995 now abandoned.

BACKGROUND OF THE INVENTION

1. Field of the Invention

The present invention relates to an apparatus for emitting auxiliary light, which is incorporated in or is used in combination with a photographing apparatus such as a camera and, more particularly, to an electric flash apparatus for controlling light emission using an MCT (MOS Controlled Thyristor).

2. Description of the Related Art

Upon control of the light emission amount or automatic light control of a discharge tube, a thyristor, an insulated gate bipolar transistor (IGBT), and the like are used as a switching control element for forcibly stopping a current flowing through the discharge tube. In particular, the IGBT can control light emission of the discharge tube by a simple circuit, and has become increasingly popular.

As the prior arts of such an element, Jpn. Pat. Appln. KOKAI Publication No. 64-17033 discloses an electric flash apparatus for performing continuous light emission by controlling the voltage applied to the gate of the IGBT, and Jpn. Pat. Appln. KOKAI Publication No. 1-124838 discloses an electric flash apparatus which can change the light emission duty using the IGBT and can perform FP light emission.

As a new switching control element, a semiconductor switching element called an MCT (MOS Controlled Thyristor) utilizing the MOS (metal oxide silicon) technique has been proposed. When this semiconductor switching element is used, a larger current than the IGBT can be controlled per unit area of the element current path. In addition, since the switching speed of this element is equivalent to that of the IGBT, it is expected that the MCT is used as a promising switching element for controlling the light-emitting element of, e.g., an electric flash apparatus.

In the MCT, FIGS. 11A and 11B are views respectively showing symbols of P- and N-MOS type MCTs, FIGS. 12A and 12B are circuit diagrams respectively showing the equivalent circuits of the P- and N-MOS type MCTs, and FIG. 13 is a sectional view showing the sectional structure of the P-MOS type MCT.

As shown in FIG. 13, the MCT is an element formed, using a known thin film formation technique, on a multi-layered structure including, in turn from the cathode side, an n-type semiconductor layer 1, a p-type semiconductor layer 2, an n-type semiconductor layer 3, a p-type semiconductor layer 4, and an n-type semiconductor layer 5.

The surface region of the n-type semiconductor layer 3 sandwiched between the p-type semiconductor layers 2 and 4 serves as an ON-FET (field effect transistor) channel region, and the surface region of the p-type semiconductor layer 4 sandwiched between the n-type semiconductor layers 3 and 5 serves as an OFF-FET channel region. A gate electrode 7 is formed on these channel regions via a gate oxide film 6.

Furthermore, an anode 9 is formed above the gate electrode 7 via an insulating film 8. The anode-cathode path basically has a PNPN thyristor structure.

In this MCT, when a voltage negative with respect to the potential of the anode 9 is applied to the gate electrode 7, a current flows from the anode 9 to the p-type semiconductor layer 2, the n-type semiconductor layer 1, and a cathode 10, and as a result, the current flows through the anode-cathode path by a thyristor operation.

On the contrary, when a voltage positive with respect to the potential of the anode 9 is applied to the gate electrode 7, the above-mentioned OFF-FET channel is formed, and shunts the anode 9 from the n-type semiconductor layer 3. As a result, the thyristor operation is disabled, and no current flows through the anode-cathode path.

FIG. 14 shows the voltage drop characteristics (calculated values) to the passing current per unit chip area of each of a MOSFET, a Darlington bipolar TR (transistor), an IGBT, and an MCT.

As can be seen from FIG. 14, the MCT has a smaller voltage drop than those of the MOSFET, the Darlington bipolar TR, and the IGBT, and can flow a very large current as compared to other elements if the chip area remains the same.

When light emission of a discharge tube is to be controlled by utilizing the above-mentioned IGBT, since the capacitance of the IGBT must be increased or a plurality of IGBTs must be arranged in an electric flash apparatus with a large light emission amount, the electric flash apparatus becomes large in size and its cost increases in order to obtain a sufficient light amount.

In general, the IGBT is turned on when a voltage of 20 to 40 V is applied to the gate-emitter path, and is turned off when the gate-emitter path is set at the same potential. When the MCT replaces the IGBT, since the MCT is a kind of thyristor, a reverse bias voltage must be applied to turn off the MCT, and hence, a conventional gate control circuit of the IGBT cannot be directly used.

On the other hand, control of a conventional thyristor is similar to that of the MCT in that the light emission of the discharge tube is controlled by applying a reverse bias voltage. However, the control of the MCT requires stricter conditions than those of the conventional thyristor control, and the voltages for turning on and off the MCT and the time required for a change in voltage for changing the MCT from the ON state to the OFF state must be suppressed to fall within predetermined condition ranges.

For example, in MCTV75P60E1 and MCTA75P60E1 (P-MOS MCTs; available from Harris Corp.), a gate-anode voltage for turning on the MCT must be set to fall within the range from −7 V to −20 V, and a gate-anode voltage for turning off the MCT must be set to fall within the range from +18 V to +20 V. In addition, in order to change the MCT from the ON state to the OFF state, the gate-anode voltage must be switched within 200 nsec. However, the conventional thyristor circuit cannot attain such control.

SUMMARY OF THE INVENTION

It is, therefore, an object of the present invention to provide a new and improved electric flash apparatus in which a large light amount (large current) can be controlled at high speed by executing light emission control of a discharge tube using a switching element comprising an MCT.

According to an aspect of the present invention, there is provided an electric flash apparatus comprising:

- a power supply circuit including a booster circuit for boosting an output voltage from a power supply battery to positive and negative voltages each having a predetermined value;
- a main capacitor charged by one of the positive and negative voltages boosted by the power supply circuit;

a discharge tube through which a discharge current based on a charge built up on the main capacitor flows, thereby performing flash light emission;

an MCT (MOS Controlled Thyristor) inserted in a loop of the discharge current from the main capacitor; and a control circuit for ON/OFF-controlling the MCT by selectively applying one of the positive and negative voltages from the power supply circuit to a gate terminal of the MCT.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a circuit diagram showing the arrangement of an electric flash apparatus according to the first embodiment of the present invention;

FIG. 2 is a circuit diagram showing the detailed circuit arrangement of a power supply circuit shown in FIG. 1;

FIG. 3 is a waveform chart showing the signal waveforms used upon control of flash light emission of the electric flash apparatus of the first embodiment;

FIG. 4 is a waveform chart showing the signal waveforms used upon repetition of successive short light emission of the electric flash apparatus of the first embodiment;

FIG. 5 is a circuit diagram showing the arrangement of an electric flash apparatus according to the second embodiment of the present invention;

FIG. 6 is a circuit diagram showing the detailed circuit arrangement of a power supply circuit shown in FIG. 5;

FIG. 7 is a waveform chart showing the signal waveforms used upon control of flash light emission of the electric flash apparatus of the second embodiment;

FIG. 8 is a waveform chart showing the signal waveforms used upon repetition of continuous short light emission of the electric flash apparatus of the second embodiment;

FIGS. 11A and 11B are views showing the symbols of MCTs (MOS controlled thyristors);

FIGS. 12A and 12B are circuit diagrams showing the equivalent circuits of the MCTs;

FIG. 16 is a waveform chart showing the waveforms of output signals, upon flash light emission, of a signal generation circuit shown in FIG. 15;

FIG. 17 is a waveform chart showing the waveforms of output signals, upon FP light emission, of the signal generation circuit shown in FIG. 15;

FIG. 21 is a circuit diagram showing the arrangement of an electric flash apparatus according to the fourth embodiment of the present invention;

FIG. 24 is a flow chart showing the operation executed when the signal generation circuit shown in FIG. 15 is constituted by a CPU.

DETAILED DESCRIPTION OF THE PREFERRED EMBODIMENTS

Figure 9:
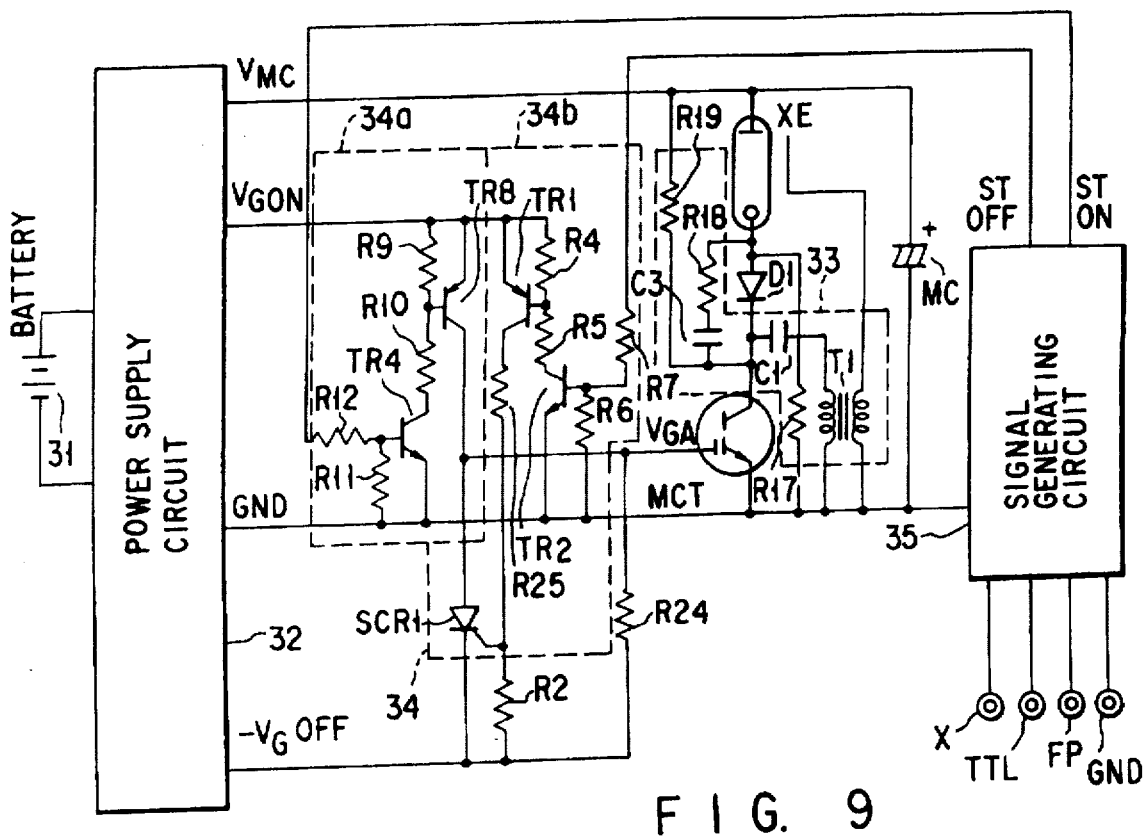
FIG. 9 is a circuit diagram showing the arrangement of an electric flash apparatus according to the third embodiment of the present invention.

Reference will now be made in detail to the presently preferred embodiments of the invention as illustrated in the accompanying drawings, in which like reference characters designate like or corresponding parts throughout the several drawings.

The preferred embodiments of the present invention will be described in detail hereinafter with reference to the accompanying drawings.

FIG. 1 shows the arrangement of an electric flash apparatus according to the first embodiment of the present invention, and the arrangement of the apparatus will be described below.

The electric flash apparatus comprises a power supply circuit 12 for generating a positive voltage $V_{GOFF}$ and a negative voltage $-V_{MC}$ based on the voltage from a low-voltage power supply battery 11, a main capacitor MC charged by the negative voltage $-V_{MC}$ from the power supply circuit 12, a xenon light-emitting unit XE for emitting light by a potential accumulated on the main capacitor MC, a trigger circuit unit 13 (to be described later), a P-MOS type MCT which constitutes a discharge loop together with the xenon light-emitting unit XE and the capacitor MC to sandwich a diode D1 therebetween, an MCT gate control circuit unit 14 for driving the MCT, and a signal generation circuit 15 for controlling output signals STON and STOFF upon reception of signals from electric contacts X, TTL, FP, and GND with a camera.

The signal generation circuit 15 controls the output signals STON and STOFF upon reception of signals from the electric contacts X, TTL, FP, and GND with the camera. Note that the contact X is a terminal for receiving a light emission start signal from the camera, and the contact TTL is a terminal for receiving a light emission stop signal. The contact FP is a terminal for receiving signals for starting and stopping successive short light emissions from the camera.

The trigger circuit unit 13 comprises a trigger transformer T1, a trigger capacitor C1, a thyristor SCR1 for shortcircuiting the primary coil of the trigger transformer T1 and the trigger capacitor C1, resistors R1 to R7, and transistors TR1 and TR2, which resistors and transistors are used for turning on the thyristor SCR1. Upon reception of a one-shot output signal of low level "L"→high level "H"→low level "L" as the output signal STON, since the transistor TR2 is turned on, and the transistor TR1 is then turned on, the thyristor SCR1 is turned on, and the charge $-V_{MC}$ on the trigger capacitor C1 instantaneously flows through the primary side of the transformer T1.

As a result, a high voltage is generated at the secondary side of the transformer T1 and excites the light-emitting unit XE.

The MCT gate control circuit 14 comprises resistors R8 to R12, transistors TR3 and TR4, and a constant voltage diode ZD1. In this MCT gate control circuit 14, when the signal STOFF is at low level "L", the transistors TR4 and TR3 are turned off, and the gate voltage of the MCT becomes equal to a voltage generated at the diode ZD1. For example, if the voltage $V_{GOFF}$ is +19 V and the diode ZD1 generates a potential difference of 30 V across its two terminals, a voltage of −11 V is applied to the gate of the MCT.

Taking MCTV75P60E1 available from Harris Corp. as an example, the MCT is turned on when an anode-gate voltage $V_{GA}$ falls within the range from −7 V to −20 V, and is turned off when the anode-gate voltage $V_{GA}$ falls within the range from +18 V to +20 V. For this reason, when the signal STOFF is at low level "L", the MCT is turned on. On the other hand, when the signal STOFF changes to high level "H", the transistors TR4 and TR3 are turned on, and the gate voltage $V_{GA}$ of the MCT becomes +19 V. Therefore, the MCT is turned off.

FIG. 2 shows the detailed circuit arrangement of the above-mentioned power supply circuit 12.

This power supply circuit 12 comprises a self-oscillation type booster circuit. A current from the battery 11 flows through the emitter-to-base path of transistor TR5 and resistor R14, with the result that transistor TR5 is turned on. Since a current flows from the emitter-to-collector path of transistor TR5 to resistor R13 and the base-to-emitter path of transistor TR5, transistor TR6 is turned on, and current flows from the primary windings of transformer T2 to the collector-to-emitter path of transistor TR6.

At the time, a positive voltage and a negative voltage appear at the respective ends of the secondary windings of the transformer (the positive voltage appears at the end which is connected to diode D3, while the negative voltage appears at that end which is connected to diode D2). Hence, a current flows from the negative-potential terminal $-V_{MC}$ to the collector-to-emitter path $V_{G}OFF$ of transistor TR7 by way of inductor L1, diode D2, and the secondary windings of transformer T2. The current is charged in capacitor C2 and also in main capacitor MC shown in FIG. 1.

At an intermediate point, the secondary winding of transformer T2 is connected to the base of transistor TR5. When a current flows through the primary winding of transformer T2, a voltage is generated at the secondary winding, and a positive voltage appears at the base of transistor TR5. (The point where the transformer is tapped is determined to produce such a voltage). As a result, transistor TR5 is turned off, and transistor TR6 is also turned off. Since the current in the primary winding of transformer T2 suddenly stops flowing, a voltage opposite in polarity is generated at the secondary winding of that transformer.

Although a current is about to flow from the positive-potential point $V_{G}OFF$ to negative potential point $-V_{MC}$, it does not flow in fact, because a current is prevented from flowing in the cathode-to-anode direction of each of diodes D2 and D3. Since a negative voltage is generated at the base of transistor TR5, this transistor TR5 is turned on, and transistor TR6 is also turned on.

In this manner, transistors TR5 and TR6 are repeatedly turned on and off, and capacitors C2 and MC are charged thereby. The final voltage level resulting from the charged state, namely the voltage represented by $V_{G}OFF$ is determined by a constant voltage circuit made up of transistor TR7, resistor R15 and constant-voltage diode ZD2. In other words, voltage $V_{G}OFF$ is determined by subtracting the voltage drop between the base and emitter from the constant voltage generated in the constant voltage diode. The voltage appearing at MC is determined by the winding number ratio of the transformer T2.

Since capacitor C2 does not have a large storage capacitance, its voltage reaches the value of $V_{G}OFF$ as soon as it is charged. On the other hand, the main capacitor has a relatively large storage capacitance, and a long time is required before the voltage of the main capacitance reaches its final value. Resistor R16 and neon tube NE serve to inform the user that the strobe is ready for use, when the main capacitor is charged to such a voltage level as permits emission of light.

Figure 18:
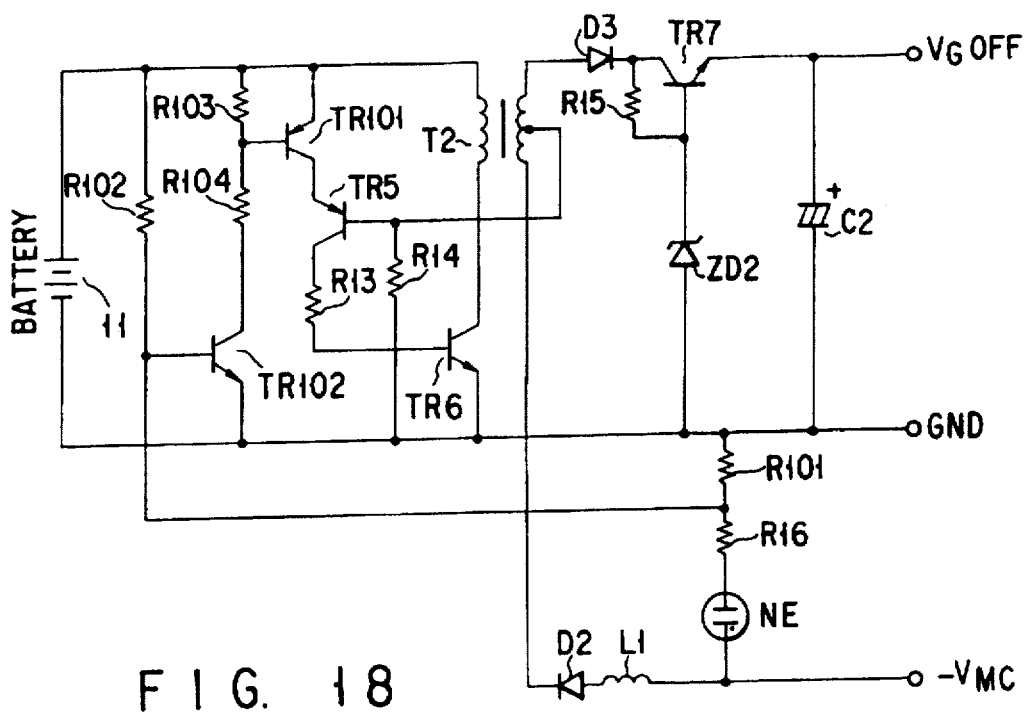
FIG. 18 is a circuit diagram showing a modification of the power supply circuit shown in FIG. 2, to which a charging stop circuit for stopping a charging operation is added.

FIG. 18 shows a modification in which a charging stop circuit for stopping the charging operation is added to the arrangement shown in FIG. 2.

In this modification, when the voltage $-V_{MC}$ is smaller than a predetermined voltage value, the neon tube NE is kept OFF, and the base voltage of a transistor TR102 assumes a value obtained by voltage-dividing the battery voltage by resistors R102 and R101. Therefore, the transistor TR102 is turned on, and a current flows through resistors R103 and R104 to turn on a transistor TR101. In this state, the operation of the above-mentioned booster circuit is performed. However, when the voltage $-V_{MC}$ has reached the predetermined voltage value, the booster circuit stops its operation. More specifically, when the voltage $-V_{MC}$ has reached the predetermined voltage value, the neon tube NE is turned on, and a current flows through the resistor R101 and a resistor R16. In this operation, since the base potential of the transistor TR102 becomes negative, the transistor TR102 is turned off, and a result, the transistor TR101 is turned off. For this reason, the operation of the booster circuit stops.

The operation of the electric flash apparatus with the above-mentioned arrangement will be described below with reference to FIGS. 3 and 4.

The signal waveforms shown in FIG. 3 exemplify flash light emission control in which light emission is started in response to a signal X for instructing light emission from a camera (not shown), and is stopped in response to a TTL light control signal. At this time, the terminal FP is held at high level "H" all the time.

When the terminal X changes to low level "L", the signal generation circuit 15 inverts the signal, and outputs the inverted signal as the signal STON. In response to this signal, the trigger circuit unit 13 starts its operation, and the light-emitting unit XE is excited and begins to discharge the charge built up on the main capacitor, thus starting light emission.

Thereafter, when a signal of low level "L" is input from the terminal TTL, the signal generation circuit 15 sets the signal STOFF at high level "H" for a predetermined period of time. Then, the voltage $V_{GA}$ applied to the gate of MCT becomes a signal similar to STOFF. The predetermined period of time corresponds to a time period long enough until the MCT is completely turned off, and thereafter, the excitation state of the light-emitting unit ends not to emit light any more even when the MCT is turned on again. Due to the operation mentioned above, the emitted light has such a waveform as is indicated by "LIGHT EMISSION WAVEFORM" in FIG. 3. As indicated, the emission of light starts when the level of the X signal changes from "H" to "L" and ends when the level of the TTL signal changes from "H" to "L".

The signal waveforms shown in FIG. 4 exemplify a case wherein successive short light emission is repeated. In particular, these signal waveforms are associated with dynamic type flash light emission which allows to use an electric flash apparatus even in a photographing operation in which the focal plane shutter is not fully opened, i.e., the shutter speed is selected to be higher than the synchronization speed.

In the operation of the camera side, the terminal FP changes to low level "L" simultaneously with travelling of the shutter front curtain (not shown), and changes to high level "H" simultaneously with the end of traveling of the shutter rear curtain. During this interval, the terminals X and TTL are kept at high level "H".

In the electric flash apparatus of this embodiment, when the terminal FP changes to low level "L", the signal generation circuit 15 changes the signal STON to high level "H" to excite the light-emitting unit XE, thus starting light emission. After an elapse of a predetermined time $t_1$, the signal generation circuit 15 changes the signal STOFF to high level "H" to set the gate-anode voltage $V_{GA}$ of the MCT to be +19 V, thereby turning off the MCT. After an elapse of a predetermined time $t_2$, the signal generation circuit 15 changes the signal STOFF to low level "L" to switch the voltage $V_{GA}$ to −11 V, thereby turning on the MCT again. Since the OFF time $t_2$ of the MCT is a very short period of time, the light-emitting unit XE is still in an excitation state and can restart light emission. In this manner, the signal STOFF is switched between low level "L" and high level "H" every predetermined times $t_1$ and $t_2$, thus repeating short light emission.

When the terminal FP is switched from low level "L" to high level "H", the signal generation circuit 15 immediately switches the signal STOFF to high level "H", and maintains this state for a predetermined period of time. This predetermined period of time corresponds to a time period long enough until the MCT is completely turned off, and thereafter, the excitation state of the light-emitting unit ends not to emit light any more even when the MCT is turned on again. Due to the operation mentioned above, the emitted light has a waveform as indicated by "LIGHT EMISSION WAVEFORM" in FIG. 4. As indicated, light is intermittently emitted when the level of the FP signal is "L".

The above-mentioned circuit arrangement is applied to a case wherein the gate-anode capacitance of the MCT is relatively small. An MCT with a high withstand voltage inevitably has a large gate-anode capacitance. For this reason, in this embodiment, a relatively long period of time is required for switching the gate voltage for turning off the MCT, thus disturbing the OFF control.

FIG. 5 shows the arrangement of an electric flash apparatus according to the second embodiment, which can solve the above-mentioned problem, and the arrangement of the apparatus will be described below.

The electric flash apparatus comprises a power supply circuit 22 for generating a positive voltage $V_{GOFF}$ and negative voltages $-V_{GON}$ and $-V_{MC}$ based on a voltage from a low-voltage power supply battery 21, a main capacitor MC charged by the negative voltage $-V_{MC}$ from the power supply circuit 22, a xenon light-emitting unit XE, a trigger circuit unit 23 (to be described later), a P-MOS type MCT which constitutes a discharge loop together with the xenon light-emitting unit XE and the capacitor MC to sandwich a diode D1 therebetween, an MCT gate control circuit unit 24, and a signal generation circuit 25.

The trigger circuit unit 23 comprises a trigger transformer T1, a trigger capacitor C1, a voltage-doubling capacitor C3, and resistors R17 to R2 (R18<<R17, R2).

When the MCT is turned on, the trigger circuit unit 23 simultaneously applies a secondary high voltage generated in the transformer T1 to the light-emitting unit XE, and applies a doubled voltage from the capacitor C3 to the light-emitting unit XE at the beginning of light emission.

For example, when the MCT is OFF, one terminal of each of the capacitors C1 and C3 is set at a potential GND and the other terminal thereof is set at a potential $-V_{MC}$. When the MCT is turned on, a charge built up on the capacitor C1 as a potential difference between the potentials GND and $-V_{MC}$ is short-circuited by a closed loop defined by the MCT and the primary side of the transformer T1. For this reason, a current instantaneously flows through the primary side, and a high voltage is generated at the secondary side of the transformer T1, thus exciting the light-emitting unit XE.

On the other hand, when the MCT is turned on, one terminal, set at the potential $-V_{MC}$ so far, of the capacitor C3 changes to the potential GND. For this reason, the GND-side terminal of the capacitor C3 is instantaneously pulled up to a potential $+V_{MC}$. Thus, since a potential of $2V_{MC}$ is instantaneously applied to the light-emitting unit XE, the unit XE can start light emission more easily. That is, when the MCT changes from the OFF state to the ON state, the light-emitting unit XE can start light emission.

The MCT gate control circuit unit 24 comprises an MCT ON control circuit section 24a which is constituted by resistors R9–R12, R20 and R21 and transistors TR4, TR8 and TR9 and turns on the MCT by setting a gate-anode voltage $V_{GA}$ of the MCT to be $-V_{GON}$, and an MCT OFF control circuit section 24b which is constituted by resistors R2 and R4 to R8, transistors TR1 and TR2, and a thyristor SCR1, and turns off the MCT by setting the voltage $V_{GA}$ of the MCT to be $+V_{GOFF}$. When a signal of high level "H" is output as an output signal STON, the MCT ON control circuit section 24a sets the voltage $V_{GA}$ to be $-V_{GON}$ since the transistor TR4 is turned on and the transistors TR8 and TR9 are turned on in turn. When a signal of high level "H" is output as an output signal STOFF, the MCT OFF control circuit section 24b sets the voltage $V_{GA}$ to be $+V_{GOFF}$ since the transistor TR2 is turned on and the transistor TR1 and the thyristor SCR1 are turned on in turn.

When neither of output signals STON and STOFF are output, i.e., in a non-operative state, the gate of the MCT is pulled up to $+V_{GOFF}$ by the resistor R8 so as to set the MCT in the OFF state.

FIG. 6 shows the detailed arrangement of the above-mentioned power supply circuit 22. The arrangement of the circuit 22 will be described below.

The power supply circuit 22 is substantially the same as the circuit shown in FIG. 2, except that a circuit which comprises a transistor TR10, a Zener diode ZD2A, a resistor R22, a diode D4, and a capacitor C4 and generates a negative voltage $-V_{GON}$ is added. More specifically, the power supply circuit 22 has a power supply voltage generation circuit utilizing the constant voltage characteristics of the Zener diode ZD2A.

Figure 19:
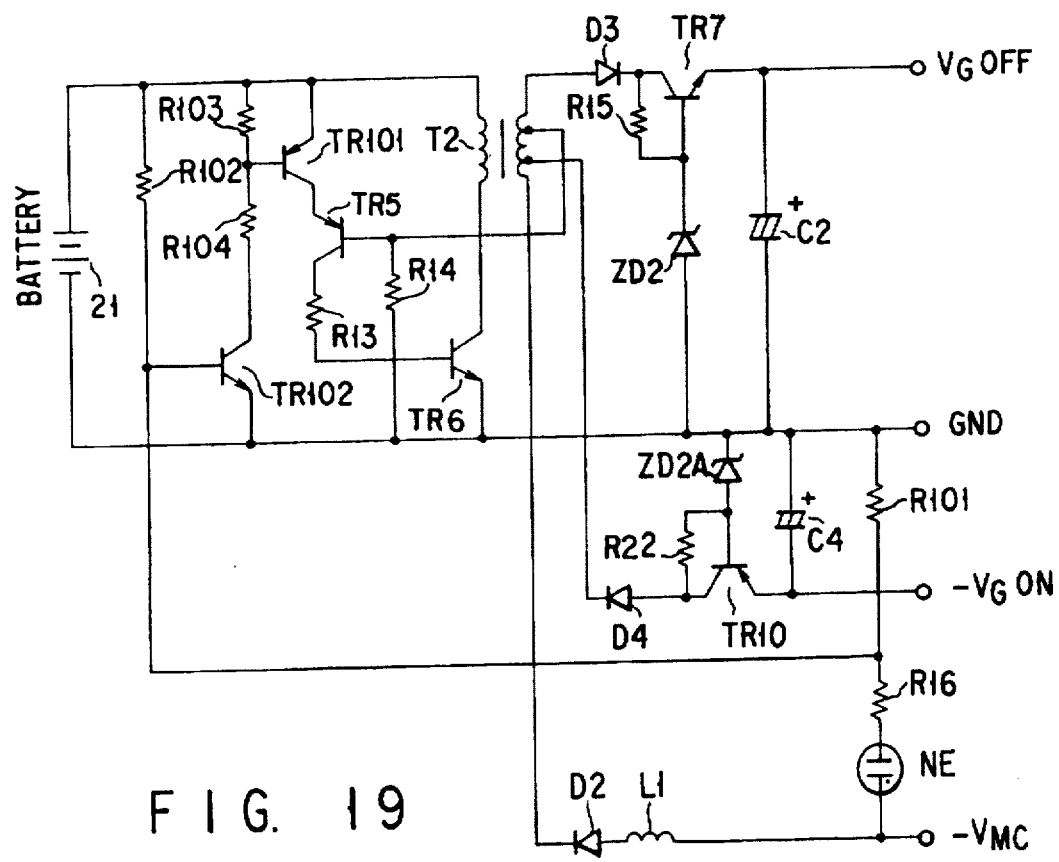
FIG. 19 is a circuit diagram showing a modification of the power supply circuit shown in FIG. 6, to which a charging stop circuit for stopping a charging operation is added.

FIG. 19 shows a modification in which a charging stop circuit for stopping the charging operation is added to the power supply circuit 22 shown in FIG. 6. In this modification, when the voltage $-V_{MC}$ is smaller than a predetermined value, the neon tube NE is kept OFF, and the base voltage of a transistor TR102 assumes a value obtained by voltage-dividing the battery voltage by resistors R101 and R102. Therefore, the transistor TR102 is turned on, and a current flows through resistors R103 and R104 to turn on a transistor TR101. In this state, the operation of the above-mentioned booster circuit is performed. However, when the voltage $-V_{MC}$ has reached the predetermined voltage value, the booster circuit stops its operation. More specifically, when the voltage $-V_{MC}$ has reached the predetermined voltage value, the neon tube NE is turned on and a current flows through the resistor R101 and a resistor R16. In this operation, since the base potential of the transistor TR102 becomes negative, the transistor TR102 is turned off, with the result that the transistor TR101 is turned off. For this reason, the operation of the booster circuit stops.

The operation of the electric flash apparatus with the above arrangement will be described below with reference to FIGS. 7 and 8.

The signal waveforms shown in FIG. 7 exemplify flash light emission control in which light emission is started in response to a signal X from a camera, and is stopped in response to a TTL light control signal. At this time, the terminal FP is held at high level "H" all the time.

When the terminal X changes to low level "L", the signal generation circuit 25 inverts the signal to set the signal STON at high level "H". At this time, the gate-anode voltage $V_{GA}$ becomes $-V_{GON}$, and the MCT is turned on. In this case, due to the presence of the gate-anode capacitance, the MCT is turned on after a short delay time. When the signal STON changes to low level "L", the transistor TR9 is turned on. However, once the MCT is turned on, it is not turned off unless a reverse bias voltage is applied to the gate of the MCT. Since the pull-up resistor R8 has a sufficiently large value, several msec are required until the gate-anode capacitance of the MCT is charged to a potential required for turning off the MCT. More specifically, the MCT is not turned off during a period required for full light emission of the light-emitting unit.

After the MCT is turned on, when a signal of low level "L" is input from the terminal TTL, the signal generation circuit 25 sets the signal STOFF at high level "H" for a predetermined period of time. Then, the thyristor SCR1 is turned on, and the gate-anode voltage $V_{GA}$ of the MCT abruptly rises to $V_{GOFF}$, thus immediately turning off the MCT. Due to the operation mentioned above, the emitted light has a waveform as indicated by "LIGHT EMISSION WAVEFORM" in FIG. 7. As indicated, the emission of light starts when the level of the X signal changes from "H" to "L" and ends when the level of the TTL signal changes from "H" to "L".

The signal waveforms shown in FIG. 8 exemplify a case wherein successive short light emission is repeated. In this case, the operation of the camera side is the same as that in the first embodiment.

In the electric flash apparatus, when the terminal FP changes to low level "L", the signal generation circuit 25 alternately outputs ON and OFF signals of the MCT. More specifically, as shown in FIG. 8, pulse signals are output as the signals STON and STOFF. A period from the start timing of light emission to the stop timing of light emission is $t_1$, and a period from the stop timing of light emission to the start timing of next light emission is $t_2$ (in practice, since the light amount per short light emission decreases as time elapses, $t_1$ is prolonged or $t_2$ is shortened). The gate of $V_{GA}$ is applied with $-11V$ (which turns on the MCT) when terminal STON becomes "H" and is applied with 19V when terminal STOFF becomes "H".

In response to these signals, the light-emitting unit XE can successively perform short light emission. This successive emission of light is indicated by "LIGHT EMISSION WAVEFORM" in FIG. 8.

When the terminal FP changes to high level "H", the signal generation circuit 25 stops output of the pulse signals as the signals STON and STOFF.

Figure 15:
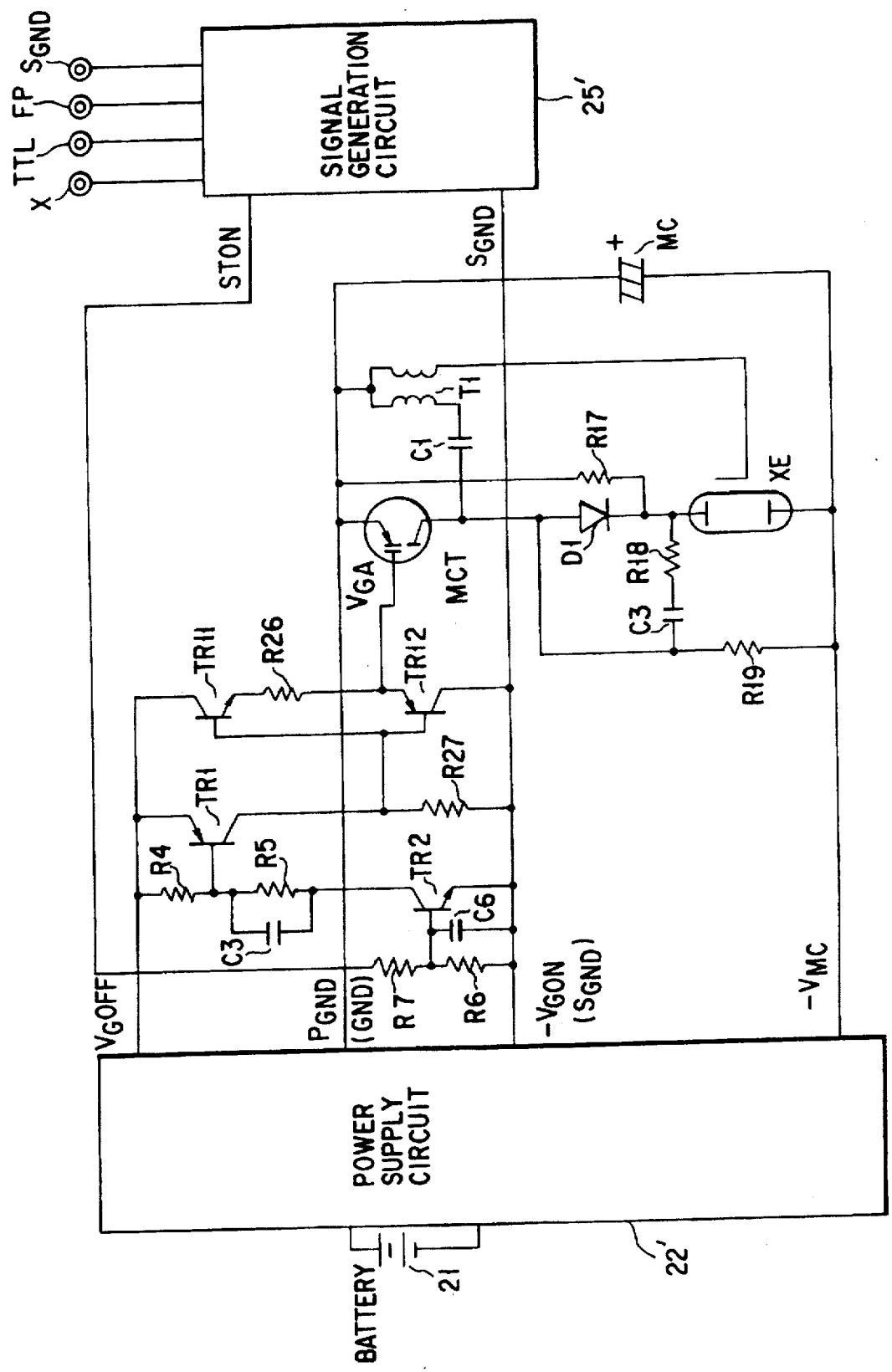
FIG. 15 is a circuit diagram showing a driver circuit of the MCT for simultaneously controlling a light emission start signal STON and light emission stop signal STOFF.

In the above-mentioned circuit arrangement, the signal generation circuit outputs the light emission start signal STON and the light emission stop signal STOFF. Alternatively, these signals may be simultaneously controlled. FIG. 15 shows a circuit for realizing this control. Note that a power supply circuit 22' is the same as that shown in FIG. 6. Note that GND in FIG. 6 is connected to PGND in FIG. 15, and $-V_{GON}$ in FIG. 6 is connected to SGND in FIG. 15.

Upon comparison between the circuit diagrams shown in FIGS. 15 and 5, a signal generation circuit 25' in FIG. 15 uses a ground terminal SGND unlike in the circuit 25 in FIG. 5. Also, the arrangement of a gate driver circuit for ON/OFF-controlling the MCT by applying a voltage to the gate terminal of the MCT in FIG. 15 is different from that in FIG. 5. Other circuits are the same in the two circuit diagrams.

The gate driver circuit for the MCT will be explained below.

When the light emission signal STON output from the signal generation circuit 25' is at high level "H" (e.g., +5 V with reference to SGND), a current flows through R7 and R6, and the transistor TR2 is turned on. For this reason, a current flows through the resistors R4 and R5, and the transistor TR3 is turned on. A current flows through resistor R27, and voltage $V_GOFF$ is generated between the ends thereof. Then, since the voltage $V_{GOFF}$ is applied to the bases of the transistors TR11 and TR12 by the resistor R27, the transistor TR11 is turned on, and the transistor TR12 is turned off. A current flows from transistor TR11 to the gate of the MCT by way of resistor R26, and the gate capacitance is spontaneously charged thereby. As a result, the voltage $V_{GA}$ applied to the gate of the MCT becomes $V_{GOFF}$. Therefore, the MCT is turned off.

On the other hand, when the light emission signal STON is at low level "L" (i.e., SGND level), since the transistor TR2 is turned off, the transistor TR1 is turned off, and a voltage of SGND is applied to the gates of the transistors TR11 and TR2 as the voltage $V_{GA}$. Therefore, since the transistor TR11 is turned off, and the transistor TR12 is turned on, $V_{GA}$ becomes SGND ($=-V_{GON}$).

Note that the transistors TR11 and TR12 coupled by the resistor R26 are NPN and PNP transistors having symmetrical characteristics, and constitute a so-called complementary type push-pull circuit. Therefore, even when the MCT has a large gate capacitance, high-speed switching can be realized. A capacitor C5 inserted in parallel with the resistor R5 is a speed-up capacitor, and can realize switching at higher speed. A capacitor C6 is inserted between the base and the emitter of transistor TR2 so as to prevent malfunction due to noise.

The light emitting circuit is made up of a main capacitor MC, MCT, diode D1 and light emitting tube Xe, which are connected in series. The triggering circuit is made up of triggering capacitor C1 and triggering transformer T1, which are connected together in the manner shown in FIG. 15. The booster circuit is made up of resistors R17 to R19 and capacitor C3, which are connected in the manner shown in FIG. 15. These circuits operate in similar ways to those of the corresponding circuits shown in FIG. 5, and are denoted by the same reference numerals as used in FIG. 5. Therefore, detailed reference to them will be omitted herein.

The signal waveforms shown in FIG. 16, exemplify flash light emission mode in which light emission is started in response to a signal X for instructing light emission from a camera (not shown), and is stopped in response to a TTL light control signal. At this time, the terminal FP is held at high level "H" all the time.

When the terminal X changes to low level "L", the signal generation circuit 25' inverts the signal, and outputs the inverted signal as the signal STON. In response to this signal, the MCT is turned on, and the light-emitting unit XE is excited and begins to discharge the charge built up on the main capacitor, thus starting light emission.

Thereafter, when a signal of low level "L" is input from terminal TTL, the signal generation circuit 25' sets the signal STON at high level "H".

When the STON is "L" in level, the gate voltage $V_{GA}$ of the MCT changes to $-11V$, thus permitting the discharge tube to emit light. When the STON is "H" in level, the gate voltage $V_{GA}$ of the MCT changes to $+19V$, thus stopping the light emission. By this operation, the strobe emits light only when the STON is "L", as indicated by "LIGHT EMISSION WAVEFORM" in FIG. 16.

The signal waveforms shown in FIG. 17 exemplify a case wherein successive short light emission is repeated. In the electric flash apparatus of this embodiment, when the terminal FP changes to low level "L", the signal generation circuit 25' changes the signal STON to low level "L" to excite the light-emission unit XE, thus starting light emission. After an elapse of a predetermined time t1, the signal generation circuit 25' changes the signal STON to high level "H" to set the gate-anode voltages $V_{GA}$ of the MCT to be +19V, thereby turning off the MCT. After an elapse of a predetermined time t2, the signal generation circuit 25' changes the signal STON to low level "L" to switch the voltage $V_{GA}$ to $-11V$, thereby turning on the MCT again. Since the OFF time t2 of the MCT is a very short period of time, the light-emitting unit XE is still in the excited state and can restart light emission. In this manner, the signal STON is switched between low level "L" and high level "H" every predetermined time t1 and t2, thus repeating short light emission.

When the terminal FP is switched from level "L" to high level "H", the signal generation circuit 25' immediately switches the signal STON to high level "H", and maintains this state ever after.

By the operation mentioned above, light is intermittently emitted when the FP signal is "L", as indicated by "LIGHT EMISSION WAVEFORM" in FIG. 17.

FIG. 9 shows the arrangement of an electric flash apparatus according to the third embodiment of the present invention. This electric flash apparatus uses an N-MOS type MCT.

The electric flash apparatus comprises a power supply circuit 32 for generating positive voltages $V_{MC}$ and $V_{GON}$ and a negative voltage $-V_{GOFF}$ based on the voltage from a low-voltage power supply battery 31, a main capacitor MC charged by the positive voltage $V_{MC}$ from the power supply circuit 32, a xenon light-emitting unit XE, a trigger circuit unit 33, an N-MOS type MCT which constitutes a series discharge loop together with the light-emitting unit XE and the main capacitor MC to sandwich a diode D1 therebetween, an MCT gate control circuit unit 34 for driving the MCT, and a signal generation circuit 35 which has the same arrangement as that in the first embodiment.

The trigger circuit unit 33 comprises a trigger transformer T1, a trigger capacitor C1, a voltage-doubling capacitor C3, and resistors R17, R18, and R19 (R19<<R17, R18). The circuit unit 33 basically has the same arrangement as that in the second embodiment, and a detailed description thereof will be omitted.

The MCT gate control circuit unit 34 comprises an MCT ON control circuit section 34a which is constituted by resistors R9 to R12 and transistors TR8 and TR4 and turns on the MCT by setting a gate-cathode voltage $V_{GK}$ of the MCT to be $V_{GON}$, and an MCT OFF control circuit section 34b which is constituted by resistors R2, R4–R7 and R25, transistors TR3 and TR4, and a thyristor SCR1, and turns off the MCT by setting the voltage $V_{GK}$ of the MCT to be $V_{GOFF}$.

In the MCT ON control circuit section 34a, when a signal of high level "H" is output as the signal STON, since the transistor TR4 is turned on, and the transistor TR8 is turned on in turn, $V_{GA}$ is set at the potential $+V_{GON}$. In the MCT OFF control circuit section 34b, when a signal of high level "H" is output as the signal STOFF, the transistor TR2 is turned on, and the transistor TR1 and the thyristor SCR1 are then turned on. For this reason, $V_{GA}$ is set at the potential $-V_{GOFF}$.

When neither of output signals STON and STOFF are output, the gate of the MCT is pulled down to $-V_{GOFF}$ by the resistor R24 so as to set the MCT in the OFF state. A resistor R25 is connected between transistor TR1 and resistor R2.

Figure 10:
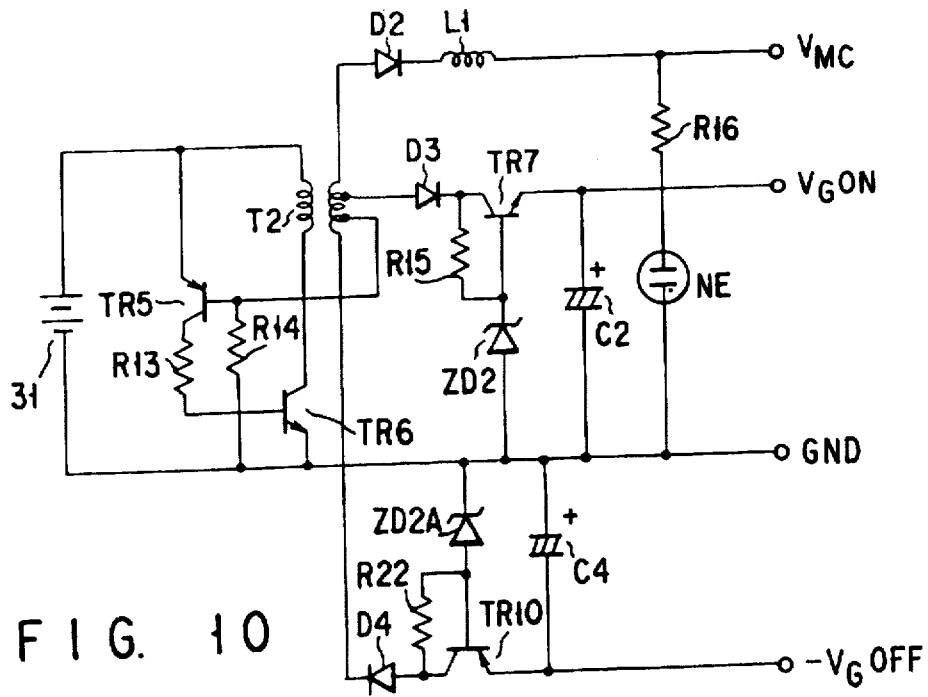
FIG. 10 is a circuit diagram showing the detailed circuit arrangement of a power supply circuit shown in FIG. 9.
Figure 13:
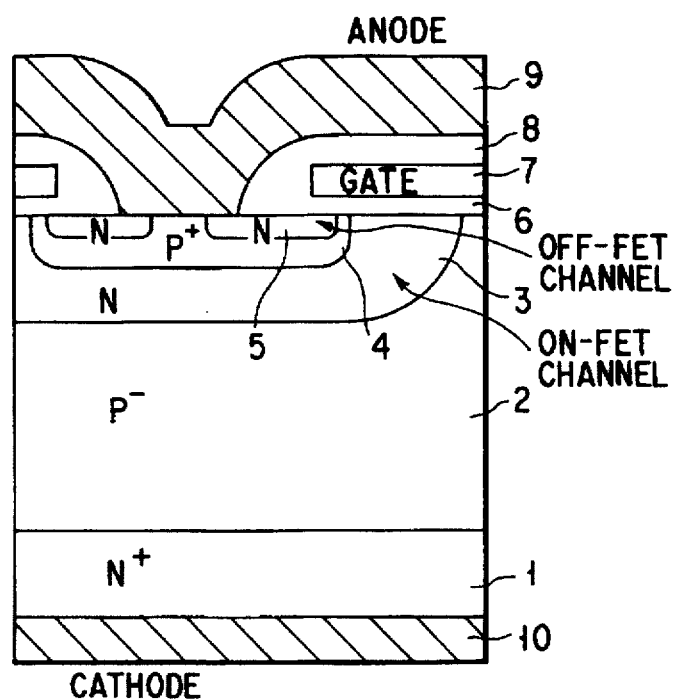
FIG. 13 is a sectional view showing the sectional structure of the MCT.
Figure 14:
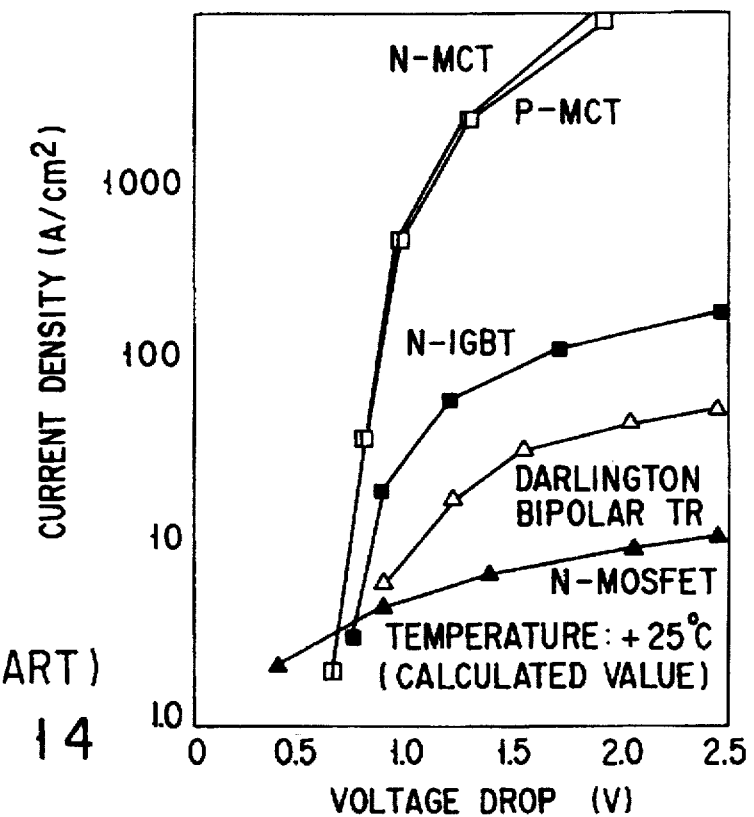
FIG. 14 is a graph showing the voltage drop characteristics with respect to the passing current per unit chip area of each of a MOSFET, a Darlington bipolar TR, an IGBT, and the MCT.

FIG. 10 shows the detailed arrangement of the above-mentioned power supply circuit 32. The arrangement of the circuit 32 will be described below.

The power supply circuit 32 is a circuit for generating the positive voltages $+V_{MC}$ and $+V_{GON}$, and the negative voltage $-V_{GOFF}$. The power supply circuit 32 has basically the same circuit arrangement as that of the power supply circuit shown in FIG. 6, except that the polarities of the secondary side of a transformer T2 are inverted, the direction of a diode is changed, and some PNP and NPN transistors are replaced. Thus, a detailed description thereof will be omitted.

The operation of the electric flash apparatus with the above arrangement is the same as that of the second embodiment. Note that the waveform of the voltage $V_{GA}$ applied to the gate-cathode path of the MCT has a shape obtained by inverting the waveform of the gate-anode voltage $V_{GA}$ of the MCT in the second embodiment. That is, the MCT is turned on when $V_{GA}=+11$ V, and is turned off when $V_{GA}=-19$ V.

As described above, the signal generation unit for turning on the MCT and the signal generation unit for turning off the MCT are arranged, and the gate voltage of the MCT is switched to the ON/OFF voltage of the MCT by the MCT gate control unit. For this reason, a voltage required for starting or stopping light emission can be applied to the gate of the MCT, and light emission can be reliably performed. An excessive voltage can be prevented from being applied to the gate of the MCT to destroy the element.

In the case of an MCT with a large gate capacitance, by using a high-speed switching element to switch a voltage instantaneously, a large current can be controlled at high speed.

Figure 20:
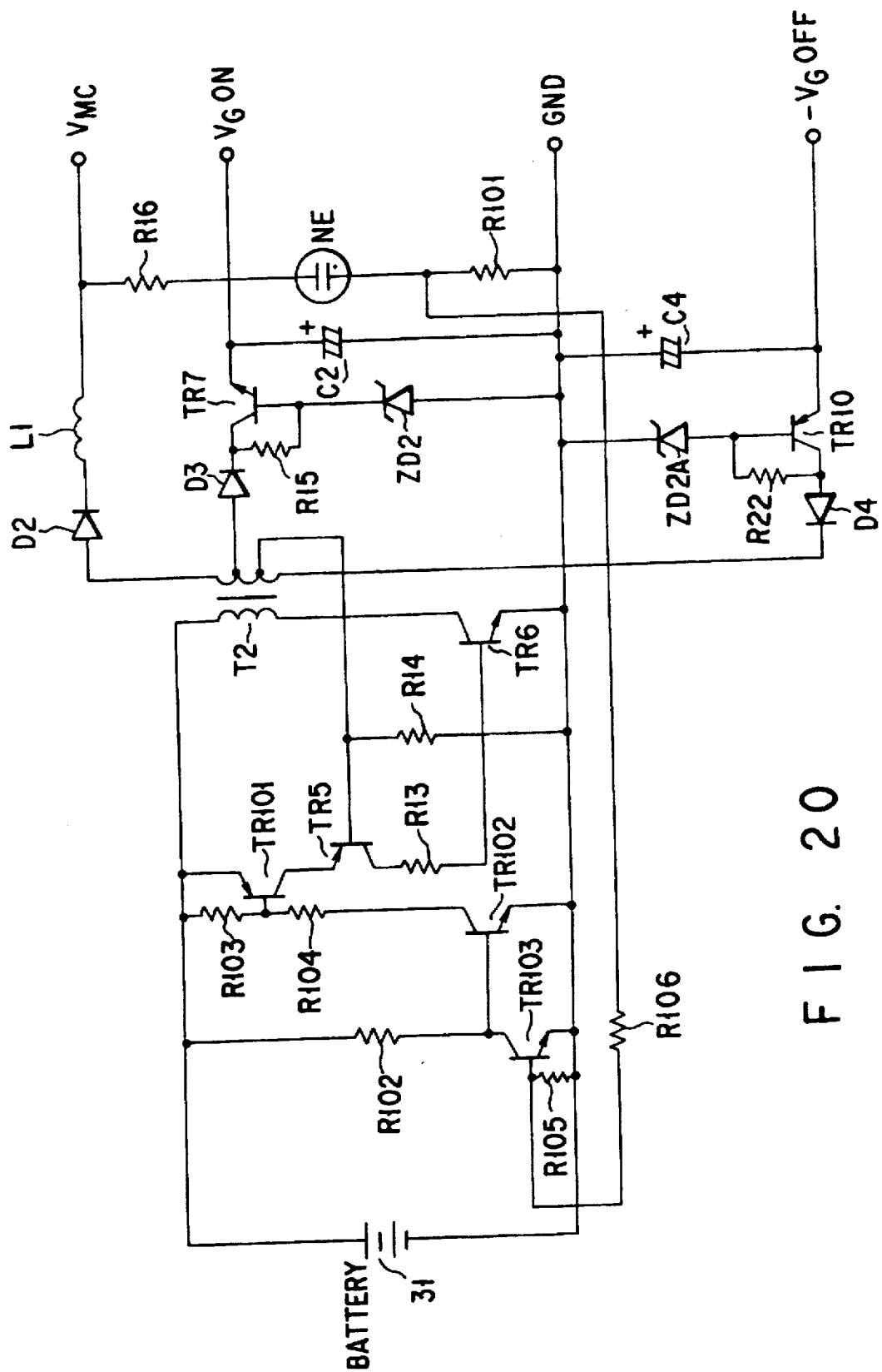
FIG. 20 is a circuit diagram showing a modification of the power supply circuit shown in FIG. 10, to which a charging stop circuit for stopping a charging operation is added.

FIG. 20 shows a modification in which a charging stop circuit for stopping the charging operation is added to the power supply circuit 32 shown in FIG. 10. The circuit of this modification performs the same operation as that of the charging stop circuit shown in FIG. 18, and a detailed description thereof will be omitted. It should be noted that transistor TR102 is turned off by means of resistors 105 and 106 and transistor TR103

FIG. 21 shows the arrangement of an electric flash apparatus according to the fourth embodiment of the present invention. The fourth embodiment exemplifies the arrangement of a light emission control circuit using a p-channel MCT.

The control circuit includes an inverter INV101, resistors R201–R205, capacitors C101 and C102 and transistors TR201–TR204.

A control terminal STC is used by a CPU (not shown) in a camera main body to control the MCT. When the terminal STC is at high level "H", the MCT is turned on; when it is at low level "L", the MCT is turned off. When the terminal STC is at high level "H", its output signal is inverted by an inverter INV101 to a low-level signal L, and a transistor TR201 is turned off. As a result, a transistor TR202 is also turned off. Therefore, since the base potentials of two complementary type transistors TR203 and TR204 are set at the $-V_{GON}$ level, the transistor TR104 is turned on, and the transistor TR103 is turned off.

Therefore, since a voltage of $-V_{GON}$ level is applied to the gate of the MCT, the MCT is turned on. On the other hand, when the terminal STC is at low level "L", its output signal is converted by the inverter INV101 to a high-level signal "H" a current flows through R201 and R202, and the transistor TR201 is turned on. Then a current flows through R203, R204 and TR201. As a result, the transistor TR102 is also turned on. For this reason, since a voltage $+V_{GOFF}$ is applied to the bases of the transistors TR203 and TR204, the transistor TR203 is turned on, and the transistor TR204 is turned off. Therefore, the voltage $+V_{GOFF}$ is applied to the gate of the MCT, and the MCT is turned on. A capacitor C102 inserted in parallel with the resistor R204 is a speed-up capacitor, and realizes switching at higher speed. Capacitor C101 is inserted between the base and emitter of transistor TR201, so as to prevent malfunction due to noise.

A light emission circuit comprises a series circuit including a main capacitor MC, a discharge tube Xe, a diode D101, and the MCT; a trigger circuit including a trigger capacitor C104 and a trigger transformer T101; and a voltage-doubling circuit including resistors R206 to R208 and a capacitor C103. In this circuit, when the MCT as a switching element is turned on, a charge on the trigger capacitor C101 flows through the primary side of the trigger transformer T101, and a high voltage is generated at the secondary side of the trigger transformer T101, thereby exciting the discharge tube Xe. At this time, since the node between the discharge tube Xe and the diode D101 is instantaneously set at $+V_{MC}$ upon operation of the voltage-doubling circuit, a voltage $2V_{MC}$ ($=+V_{MC}-(-V_{MC})$) is applied to the discharge tube, thus facilitating light emission.

More specifically, in the light emission control circuit according to the fourth embodiment, the start/stop of light emission can be controlled by controlling only the MCT.

Figure 22:
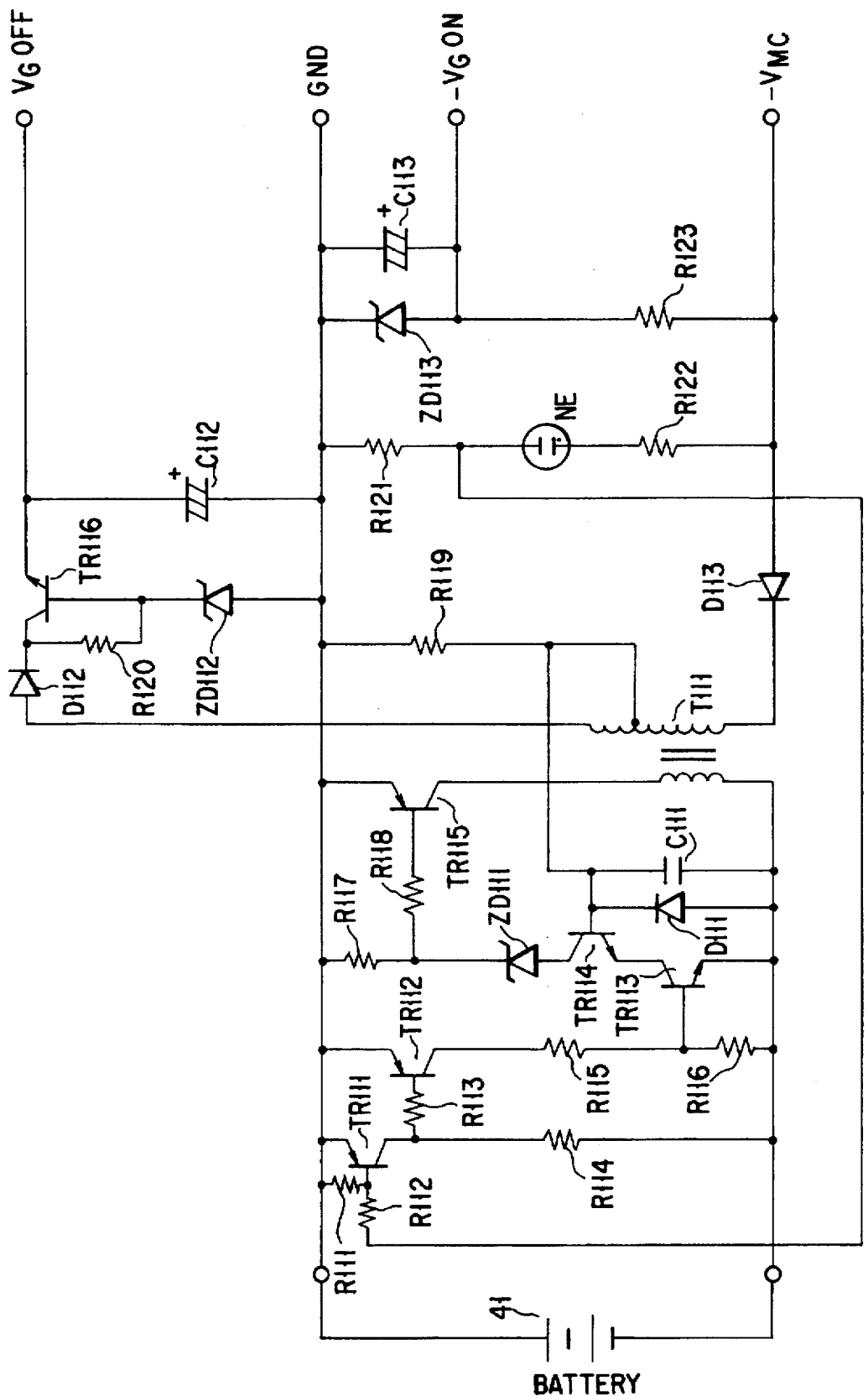
FIG. 22 is a circuit diagram showing the detailed arrangement of a power supply circuit shown in FIG. 21.

FIG. 22 shows the arrangement of a power supply circuit which can drive the MCT in the electronic flash apparatus shown in FIG. 21.

This power supply circuit outputs $-V_{GON}$ and $+V_{GOFF}$ to drive the MCT, and can charge the main capacitor MC. This circuit comprises, on the primary side of a booster transformer T111, a circuit for permitting/inhibiting the booster operation of a low-voltage power supply battery 41, and a switching portion for tuning on/off the primary side of the booster transformer T111. The former circuit comprises transistors TR111 to TR113, and resistors R111 to R116. When one terminal of the resistor R112 is at the GND level, the transistor TR111 is turned off, and hence, the transistors TR112 and TR113 are turned on, thus permitting the booster operation. On the other hand, when one terminal of the resistor R112 is set at a negative potential, the transistor TR111 is turned on, and the transistors TR112 and TR113 are turned off, thus inhibiting the booster operation.

Resistors R117 to R119, transistors TR114 and TR115, a constant voltage diode ZD111, a diode D111, a capacitor C111, and the booster transformer T111 constitute a voltage booster section.

The operation of this circuit is started when a current flows from the resistor R119 to the base of the transistor TR114. The transistor TR114 is turned on, and the transistor TR115 is also turned on. When a current flows through the transistor TR115, a current flows through the primary side of the transformer T111, and a high voltage is generated at its secondary side.

At this time, a negative voltage is generated at the node between the transformer T111 and the resistor R119, thus turning off the transistor TR114.

Then, the transistor TR115 is turned off to stop the current flowed so far. Since the voltage value of the resistor R119 is restored to the original value again, a current flows through the transistor TR114 via the resistor R119, and the transistor TR114 is turned on. Upon repetition of this operation, the booster circuit operates.

The high voltage generated at the secondary side is connected to the main capacitor MC via a rectifying diode D113 and is charged on the capacitor MC as time elapses. When the capacitor MC has been charged to a predetermined voltage (e.g., −300 V), a neon tube NE is turned on through the resistors R121 and R122, and the node between resistors R121 and R112 is set at a minus voltage. For this reason, the transistor TR111 is turned on, and the booster operation ends.

The voltage $+V_{GOFF}$ is generated in the process of charging the capacitor MC by the transformer T111. A rectifying diode ZD112, a transistor TR116, a resistor R120, a constant voltage diode D112, and a capacitor C112 generate a predetermined positive voltage (e.g., a voltage value of +20 V).

The voltage $-V_{GON}$ (e.g., −10 V) is generated by a constant voltage diode ZD113, a resistor R123, and a capacitor C113 by utilizing the charge charged on the main capacitor MC.

Figure 23:
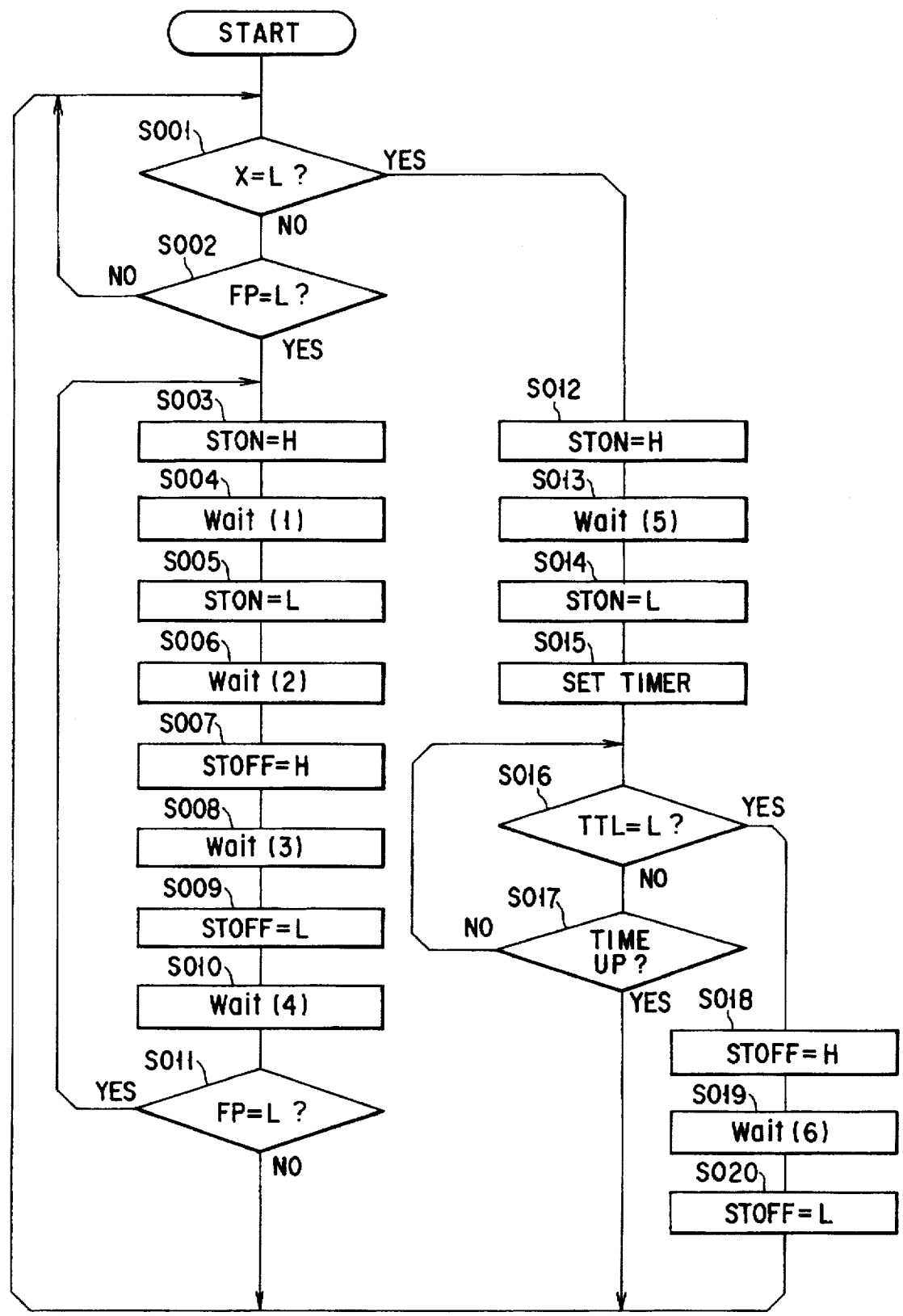
FIG. 23 is a flow chart showing the operation executed when the signal generation circuit shown in FIGS. 1, 5, and 9 is constituted by a CPU.

FIG. 23 is a flow chart showing the operation executed when the signal generation circuit shown in FIGS. 1, 5, and 9 is constituted by a CPU. First, it is checked in a loop of steps S001 and S002 if the terminal X or FP is set at low level "L". If the terminal X is set at low level "L", the flow advances to step S012. If the terminal TTL is at low level "L", the flow advances to step S003.

In steps S012 to S014, a signal of high level "H" is output as the signal STON during a time interval defined by WAIT(5). Thereafter, a timer is set in step S015, and the control waits in a loop of steps S016 and S017 until the terminal TTL changes to low level "L" or the timer reaches a time-up state. If the terminal TTL changes to low level "L" before the timer reaches a time-up state, the flow advances to steps S016 to S020, and the signal STOFF is set at high level "H" for a time interval defined by WAIT(6). Thereafter, the flow returns to step S001. If the timer has reached the time-up state before the terminal TTL changes to low level "L", the flow directly returns to step S001.

On the other hand, when the flow advances to step S003, the signal STON is set at high level "H" for a predetermined period of time (WAIT(1)) in steps S003 to S005, and the control waits for a predetermined period of time (WAIT(2)). Subsequently, the signal STOFF is set at high level "H" for a predetermined period of time (WAIT(8)) in steps S007 to S009. Thereafter, the controls waits for a time interval defined by WAIT(4), and the terminal FP is checked. If the terminal FP is at low level "L", the flow returns to step S003 to repeat the above-mentioned operation; otherwise, the flow returns to step S001.

FIG. 24 is a flow chart showing the operation executed when the signal generation circuit shown in FIG. 15 is constituted by a CPU. First, it is checked in a loop of steps S101 and S102 if the terminal X or FP is set at low level "L". If the terminal X is set at low level "L", the flow advances to step S108. If the terminal TTL is at low level "L", the flow advances to step S103.

The signal STON is set at high level "H" in step S108, and thereafter, a timer is set in step S109. The control waits in a loop of steps S110 and S111 until the terminal TTL changes to low level "L" or the timer reaches a time-up state. If the terminal TTL is set at low level "L" or the timer has reached a time-up state, the flow advances to step S112 to set the signal STON at low level "L". Thereafter, the flow returns to step S001.

On the other hand, when the flow advances to step S103, the signal STON is set at high level "H" in step S103, and the control waits for a time interval defined by WAIT(11). The signal STON is then set at low level "L" in step S105. Thereafter, the control waits for a time interval defined by WAIT(4), and the terminal FP is checked. If the terminal TTL is at low level "L", the flow returns to step S103 to repeat the above-mentioned operation; otherwise, the flow returns to step S101.

According to the embodiments of the present invention, the following arrangement is obtained.

(1) An electric flash apparatus comprising:
a discharge tube discharged by a charge built up on a main capacitor;
an MCT (MOS Controlled Thyristor) inserted in a discharge loop of the main capacitor; and
a gate control circuit for controlling the gate electrode of the MCT using positive and negative voltages.

According to the electric flash apparatus described in (1), since the electric flash apparatus can be controlled using the MCT, a large current can be controlled.

(2) An electric flash apparatus described in (1), wherein the apparatus has a booster circuit for boosting a voltage of a power supply battery to obtain a charging voltage for charging the main capacitor, and the booster circuit outputs boosted voltages of the positive and negative voltages.

According to the electric flash apparatus described in (2), since the voltage from the power supply battery is boosted by the booster circuit, a low-voltage source such as a dry cell can be used.

(3) An electric flash apparatus described in (1) or (2), wherein one of the positive and negative voltages used in the gate control circuit uses the charging voltage of the main capacitor.

According to the electric flash apparatus described in (3), since the charging voltage of the main capacitor is used, the arrangement can be simplified.

(4) An electric flash apparatus described in (1) or (2), wherein the apparatus has a booster circuit for outputting a first boosted voltage for charging the main capacitor, a second boosted voltage of the positive voltage for controlling the gate of the MCT, and a third boosted voltage of the negative voltage for controlling the gate of the MCT.

According to the electric flash apparatus described in (4), since the voltages for controlling the gate of the MCT are generated, the gate can be controlled without changing the voltages.

(5) An electric flash apparatus described in (1) to (4), wherein the gate control circuit has a high-speed switching element for connecting one of the positive and negative voltages to the gate electrode of the MCT.

According to the electric flash apparatus described in (5), even when the MCT has a large gate-anode capacitance, the MCT can be reliably switched.

(6) An electric flash apparatus described in (1) to (5), wherein the apparatus has signal generation means for independently generating an ON signal for turning on the MCT and an OFF signal for turning off the MCT to the gate of the MCT.

According to the electric flash apparatus described in (6), the MCT can be reliably ON/OFF-controlled.

(7) An electric flash apparatus described in (1) to (5), wherein the apparatus has signal generation means for outputting a control signal for ON/OFF-controlling the MCT using high- and low-level signals to the gate of the MCT.

According to the electric flash apparatus described in (7), only one signal line is required, and the arrangement is simple.

(8) A flash light emission control apparatus comprising:
a power supply circuit;
a main capacitor charged by the power supply circuit;
a discharge tube discharged by a charge built up on the main capacitor;
a trigger circuit for exciting the discharge tube;
an MCT (MOS Controlled Thyristor) inserted in a discharge loop of the main capacitor;
an MCT gate control circuit for ON/OFF-controlling the MCT; and
signal generation means for outputting a control signal to the gate control circuit.

According to the flash light emission control apparatus described in (8), since an electric flash apparatus can be controlled using the MCT, a large current can be controlled.

(9) A flash light emission control apparatus described in (8), wherein the MCT comprises a P-MOS type MCT, and the power supply circuit comprises means for generating a negative voltage for charging the main capacitor, and means for generating a positive voltage to be applied to a gate of the MCT to turn off the MCT, and
the power supply circuit or the MCT gate control circuit comprises means for generating a negative voltage to be applied to the gate to turn on the MCT.

According to the flash light emission control apparatus described in (9), optimal control can be attained using the P-MOS type MCT.

(10) A flash light emission control apparatus described in (8), wherein the MCT comprises an N-MOS type MCT, and the power supply circuit comprises means for generating a positive voltage for charging the main capacitor, and means for generating a negative voltage to be applied to a gate of the MCT to turn off the MCT, and
the power supply circuit or the MCT gate control circuit comprises means for generating a positive voltage to be applied to the gate to turn on the MCT.

According to the flash light emission control apparatus described in (10), optimal control can be attained using the N-MOS type MCT.

(11) A flash light emission control apparatus described in (8) to (10), wherein the MCT gate control circuit has a high-speed switching element for turning off the MCT.

According to the flash light emission control apparatus described in (11), even when the MCT has a large gate-anode capacitance, the MCT can be switched reliably.

As described above, according to the present invention, an electric flash apparatus which attains light emission control using a switching element comprising an MCT and can control a large light amount (large current) at high speed can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An electric flash apparatus comprising:

a power supply circuit including a booster circuit for boosting an output voltage from a power supply battery to positive and negative voltages each having a predetermined value, said booster circuit having at least three output terminals, said at least three output terminals including a positive voltage output terminal, a negative voltage output terminal and a ground output terminal, a constant voltage element coupled between the positive voltage output terminal and the ground output terminal, and another constant voltage element coupled between the negative voltage output terminal and the ground output terminal, each constant voltage element maintaining a respective predetermined voltage as said positive and negative voltages, respectively;

a main capacitor charged by one of the positive and negative voltages boosted by said power supply circuit;

a discharge tube through which a discharge current based on a charge built up on said main capacitor flows, thereby performing flash light emission;

an MCT (MOS Controlled Thyristor) inserted in a loop of the discharge current from said main capacitor; and a control circuit, including a complementary type push-pull circuit connected to a gate terminal of said MCT, for ON/OFF-controlling said MCT by selectively applying one of the positive and negative voltages from said power supply circuit to the gate terminal of said MCT.

2. An apparatus according to claim 1, further comprising a signal generation circuit for generating a control signal to the gate terminal of said MCT.

3. An apparatus according to claim 2, wherein said signal generation circuit has an electric flash ON terminal for turning on said MCT and an electric flash OFF terminal for turning off said MCT, said control circuit is connected to said electric flash ON terminal and can apply one of the positive and negative voltages for turning on the MCT to the gate terminal of said MCT in accordance with a signal from said electric flash ON terminal, and said control circuit is connected to said electric flash OFF terminal and can apply one of the positive and negative voltages for turning off the MCT to the gate terminal of said MCT in accordance with a signal from said electric flash OFF terminal.

4. An apparatus according to claim 2, wherein the control signal is output in a signal format of binary signals, and said control circuit applies the positive voltage to the gate terminal of said MCT in response to one signal of the binary signals and applies the negative voltage to the gate terminal of said MCT in response to the other signal of the binary signals.

5. An apparatus according to claim 1, wherein said power supply circuit comprises detection means for detecting a voltage charged on said main capacitor, and stop means for stopping a booster operation when said detection means detects that the voltage has reached a predetermined voltage.

6. An electric flash apparatus comprising:

a power supply circuit including a booster circuit for boosting an output voltage from a power supply battery to positive and negative voltages each having a predetermined value, said booster circuit having at least three output terminals, said at least three output terminals including a positive voltage output terminal, a negative voltage output terminal and a ground output terminal, a constant voltage element coupled between the positive voltage output terminal and the ground output terminal, and another constant voltage element coupled between the negative voltage output terminal and the ground output terminal, each constant voltage element maintaining a respective predetermined voltage as said positive and negative voltages, respectively;

a main capacitor charged by one of the positive and Negative voltages boosted by said power supply circuit;

a discharge tube discharged by a charge built up on said main capacitor, thereby performing flash light emission;

an MCT (MOS Controlled Thyristor) inserted in a discharge loop of said main capacitor; and a control circuit, including a high-speed switching element for connecting one of positive and negative voltages and a gate electrode of said MCT, for controlling the gate electrode of said MCT using said positive and negative voltages.

7. An apparatus according to claim 6, further comprising a booster circuit for boosting a voltage from a power supply battery to obtain a charging voltage for charging said main capacitor, said booster circuit outputting boosted voltages of the positive and negative voltages.

8. An apparatus according to claim 6, wherein one of the positive and negative voltages used in said gate control circuit uses the charging voltage of said main capacitor.

9. An apparatus according to claim 6, further comprising signal generation means for independently generating an ON signal for turning on said MCT and an OFF signal for turning off said MCT to the gate electrode of said MCT.

10. An apparatus according to claim 6, further comprising signal generation means for outputting a control signal for ON/OFF-controlling said MCT using high- and low-level signals to the gate electrode of said MCT.

11. An electric flash apparatus comprising:

a power supply circuit including a booster circuit for boosting an output voltage from a power supply battery to positive and negative voltages each having a predetermined value, said booster circuit having at least three output terminals, said at least three output terminals including a positive voltage output terminal, a negative voltage output terminal and a ground output terminal, a constant voltage element coupled between the positive voltage output terminal and the ground output terminal, and another constant voltage element coupled between the negative voltage output terminal and the ground output terminal, each constant voltage element maintaining a respective predetermined voltage as said positive and negative voltages, respectively;

a main capacitor charged by said power supply circuit;

a discharge tube discharged by a charge built up on said main capacitor, thereby performing flash light emission;

a trigger circuit for exciting said discharge tube;

an MCT (MOS Controlled Thyristor) inserted in a discharge loop of said main capacitor;

an MCT gate control circuit, including a high-speed switching element connected to a gate terminal of said MCT, for ON/OFF-controlling said MCT; and signal generation means for outputting a control signal to said gate control circuit.

12. An apparatus according to claim 11, wherein said MCT comprises a P-MOS type MCT, said power supply circuit comprises means for generating a negative voltage for charging said main capacitor and means for generating a positive voltage to be applied to the gate terminal of said MCT to turn off said MCT, and one of said power supply circuit and said MCT gate control circuit comprises means for generating a negative voltage to be applied to the gate terminal to turn on said MCT.

13. An apparatus according to claim 11, wherein said MCT comprises an N-MOS type MCT, said power supply circuit comprises means for generating a positive voltage for charging said main capacitor and means for generating a negative voltage to be applied to the gate terminal of said MCT to turn off said MCT, and one of said power supply circuit and said MCT gate control circuit comprises means for generating a positive voltage to be applied to the gate terminal to turn on said MCT.

14. An apparatus according to claim 11, wherein said power supply circuit outputs positive and negative voltages, said apparatus further comprises a voltage conversion circuit for converting at least one of the positive and negative Voltage to a predetermined voltage, and said MCT gate control circuit controls the gate of said MCT on the basis of one of the positive and negative voltages output from said power supply circuit, and an output voltage from said voltage conversion circuit.

15. An apparatus according to claim 11, wherein a ground level of a signal output from said signal generation means is equal to a voltage level for turning on said MCT.

16. An apparatus according to claim 11, wherein a ground level of a signal output from said signal generation means is equal to a voltage level at one of two terminals of said main capacitor.

17. An artificial illumination apparatus comprising:

a power supply circuit including a booster circuit for boosting an output voltage from a power supply battery to positive and negative voltages each having a predetermined value, said booster circuit having at least three output terminals, said at least three output terminals including a positive voltage output terminal, a negative voltage output terminal and a ground output terminal, a constant voltage element coupled between the positive voltage output terminal and the ground output terminal, and another constant voltage element coupled between the negative voltage output terminal and the ground output terminal, each constant voltage element maintaining a respective predetermined voltage as said positive and negative voltages, respectively;

a main capacitor charged by one of the positive and negative voltages boosted by said power supply circuit;

a charging circuit for boosting a power supply voltage and charging said main capacitor;

a discharge tube for performing flash light emission by discharging a charge built up on said main capacitor;

an MCT (MOS Controlled Thyristor) inserted in a discharge loop of said main capacitor; and control means, including a complementary type push-pull circuit connected to a gate terminal of said MCT, for ON/OFF-controlling said MCT by selectively applying a first voltage generated from one of the power supply voltage and a charging voltage of said main capacitor, and a second voltage different from the first voltage to a control electrode of said MCT.

18. An artificial illumination apparatus comprising:

a power supply circuit including a booster circuit for boosting an output voltage from a power supply battery to positive and negative voltages each having a predetermined value, said booster circuit having at least three output terminals, said at least three output terminals including a positive voltage output terminal, a negative voltage output terminal and a ground output terminal, a constant voltage element, coupled between the positive voltage output terminal and the ground output terminal, and another constant voltage element coupled between the negative voltage output terminal and the ground output terminal, each constant voltage element maintaining a respective predetermined voltage as said positive and negative voltages, respectively;

a main capacitor charged by one of the positive and negative voltages boosted by said power supply circuit;

a charging circuit for boosting a power supply voltage and charging said main capacitor;

a discharge tube for performing flash light emission by discharging a charge built up on said main capacitor;

a switching element inserted in a discharge loop of said main capacitor;

voltage output means for outputting a first voltage generated from one of the power supply voltage and a charging voltage of said main capacitor, and a second voltage different from the first voltage;

pulse train generation means for generating a pulse train; and voltage applying means, including a complementary type push-pull circuit connected to a gate terminal of said MCT, for applying the first and second voltages to a control electrode of said switching element in accordance with the pulse train.

* * * * *